US012687932B2

(12) United States Patent (10) Patent No.: US 12,687,932 B2
Yogeeswaran et al. (45) Date of Patent: Jul. 21, 2026

(54) RENDERING FINE DETAIL SURFACE GEOMETRY ON AN ACTIVE SURFACE HAPTIC DISPLAY

(71) Applicant: Haptych Corp., San Carlos, CA (US)

(72) Inventors: Karthik Yogeeswaran, San Carlos, CA (US); Nicholas H. Patino, Boulder, CO (US); Jessica Hartcher O'Brien, Redmond, WA (US)

(73) Assignee: Haptych Corp., San Carlos, CA (US)

( * ) Notice: Subject to any disclaimer, the term of this patent is extended or adjusted under 35 U.S.C. 154(b) by 0 days.

(21) Appl. No.: 19/302,581

(22) Filed: Aug. 18, 2025

(65) Prior Publication Data

US 2026/0064206 A1 Mar. 5, 2026

Related U.S. Application Data

(60) Provisional application No. 63/689,669, filed on Aug. 31, 2024.

(51) Int. Cl.
*G06F 3/01* (2006.01)
*G06F 3/043* (2006.01)
(52) U.S. Cl.
CPC .............. *G06F 3/016* (2013.01); *G06F 3/043* (2013.01); *G06F 2203/014* (2013.01)
(58) Field of Classification Search
CPC ........... G06F 3/016; G06F 3/043–0436; G06F 2203/014
See application file for complete search history.

(56) References Cited

U.S. PATENT DOCUMENTS

| | | | | |
|---|---|---|---|---|
| 7,629,969 B2 * | 12/2009 | Kent | ..................... | G06F 3/0436 |
| | | | | 345/212 |
| 8,421,776 B2 * | 4/2013 | Kent | ..................... | G06F 3/0436 |
| | | | | 345/177 |
| 8,884,927 B1 | 11/2014 | Cheatham, III et al. | | |
| 8,907,930 B2 * | 12/2014 | Alberth | ................ | G06F 3/0418 |
| | | | | 345/177 |

(Continued)

OTHER PUBLICATIONS

Shinohara, Masami, Yutaka Shimizu, and Akira Mochizuki. "Three-dimensional tactile display for the blind." IEEE Transactions on Rehabilitation Engineering 6.3 (1998): 249-256.

(Continued)

*Primary Examiner* — Gene W Lee
(74) *Attorney, Agent, or Firm* — Brian R. Short

(57) ABSTRACT

Systems, methods, and apparatuses for rendering fine detail surface geometry on an active surface haptic display. One system includes a haptic surface, a plurality of actuators and a plurality of channel decorrelator elements. Each actuator is configured to generate mechanical waves in the haptic surface through control of each of the plurality of actuators, and wherein individual pixels of a plurality of pixels of the haptic surface are individually addressable by multiplexing of (either time or frequency of) the mechanical waves which generate mechanical displacement of one or more vector axes at locations of each of the individual pixels, wherein the plurality of channel decorrelator elements are located and configured to decorrelate different transmission paths between the plurality of actuators and the locations of the plurality of pixels on the haptic surface.

15 Claims, 27 Drawing Sheets

110 - Haptic System
111 - Haptic surface
112 - Periphery of haptic surface
113 - Actuator
114 - Channel decorrelator element which uses scattering
115 - Channel decorrelator element which uses dispersion
116 - Potential target pixel
117 - Boundary of fingertip which has been detected on the surface
118 - Pixels which are being targeted and transmitted to
119 - Sensor which detects location and extent of fingertip or body part in contact with haptic surface

(56)     References Cited

U.S. PATENT DOCUMENTS

| 8,941,623 | B2 * | 1/2015 | Alberth | G06F 3/043 |
| | | | | 345/177 |
| 9,152,276 | B2 * | 10/2015 | Dahl | G06F 3/043 |
| 9,329,728 | B2 * | 5/2016 | Dahl | G06F 3/043 |
| 9,524,048 | B2 * | 12/2016 | Jiang | G06F 3/0386 |
| 9,804,675 | B2 | 10/2017 | Cheatham, III et al. | |
| 10,168,782 | B1 | 1/2019 | Tchon | |
| 10,818,162 | B2 * | 10/2020 | Carter | G10K 11/34 |
| 11,126,263 | B2 | 9/2021 | Boulanger et al. | |
| 11,209,931 | B2 | 12/2021 | Lynn et al. | |
| 11,392,250 | B1 * | 7/2022 | Khajeh | G06F 3/04144 |
| 11,520,407 | B2 * | 12/2022 | Shu | G06F 3/012 |
| 11,822,724 | B2 | 11/2023 | Harazi | |
| 2022/0147169 | A1 * | 5/2022 | Sheng | B06B 1/0207 |
| 2026/0111086 | A1 * | 4/2026 | Li | G06F 3/044 |

OTHER PUBLICATIONS

Ikei, Yasushi, Mariko Yamada, and Shuichi Fukuda. "A new design of haptic texture display-Texture Display2-and its preliminary evaluation." Proceedings IEEE Virtual Reality 2001. IEEE, 2001.

Pasquero, Jérôme, and Vincent Hayward. "STReSS: A practical tactile display system with one millimeter spatial resolution and 700 Hz refresh rate." Proc. Eurohaptics. vol. 2003. 2003.

Wang, Qi, and Vincent Hayward. "Compact, portable, modular, high-performance, distributed tactile transducer device based on lateral skin deformation." 2006 14th Symposium on Haptic Inter-faces for Virtual Environment and Teleoperator Systems. IEEE, 2006.

Sawada, Hideyuki, and Potsawat Boonjaipetch. "Tactile pad for the presentation of tactile sensation from moving pictures." 2014 7th International Conference on Human System Interactions (HSI). IEEE, 2014.

Baba, Yusuke, et al. "A Pin-Array Tactile Display Using Shape-Memory Alloy Wires for the Presentation of Various Tactile Sensation." Int. J. Innov. Comput. Inf. Control 20 (2024): 653-664.

Carter, Tom, et al. "UltraHaptics: multi-point mid-air haptic feed-back for touch surfaces." Proceedings of the 26th annual ACM symposium on User interface software and technology. 2013.

Shultz, Craig, and Chris Harrison. "Flat panel haptics: Embedded electroosmotic pumps for scalable shape displays." Proceedings of the 2023 CHI conference on human factors in computing systems. 2023.

Stanley, Andrew A., Erik S. Roby, and Sean J. Keller. "High-speed fluidic processing circuits for dynamic control of haptic and robotic systems." Science Advances 10.14 (2024): eadl3014.

Chubb, Erik C., J. Edward Colgate, and Michael A. Peshkin. "ShiverPad: A device capable of controlling shear force on a bare finger." World Haptics 2009-Third Joint EuroHaptics conference and Symposium on Haptic Interfaces for Virtual Environment and Teleoperator Systems. IEEE, 2009.

Reardon, Gregory, et al. "Elastowave: Localized tactile feedback in a soft haptic interface via focused elastic waves." 2020 IEEE Haptics Symposium (Haptics). IEEE, 2020.

Perrotta, Michael V., Thorhildur Asgeirsdottir, and David M. Eagle-man. "Deciphering soundsvibration on the skin." Neuroscience 458 (2021): 77-86.

* cited by examiner 111     110     116     113

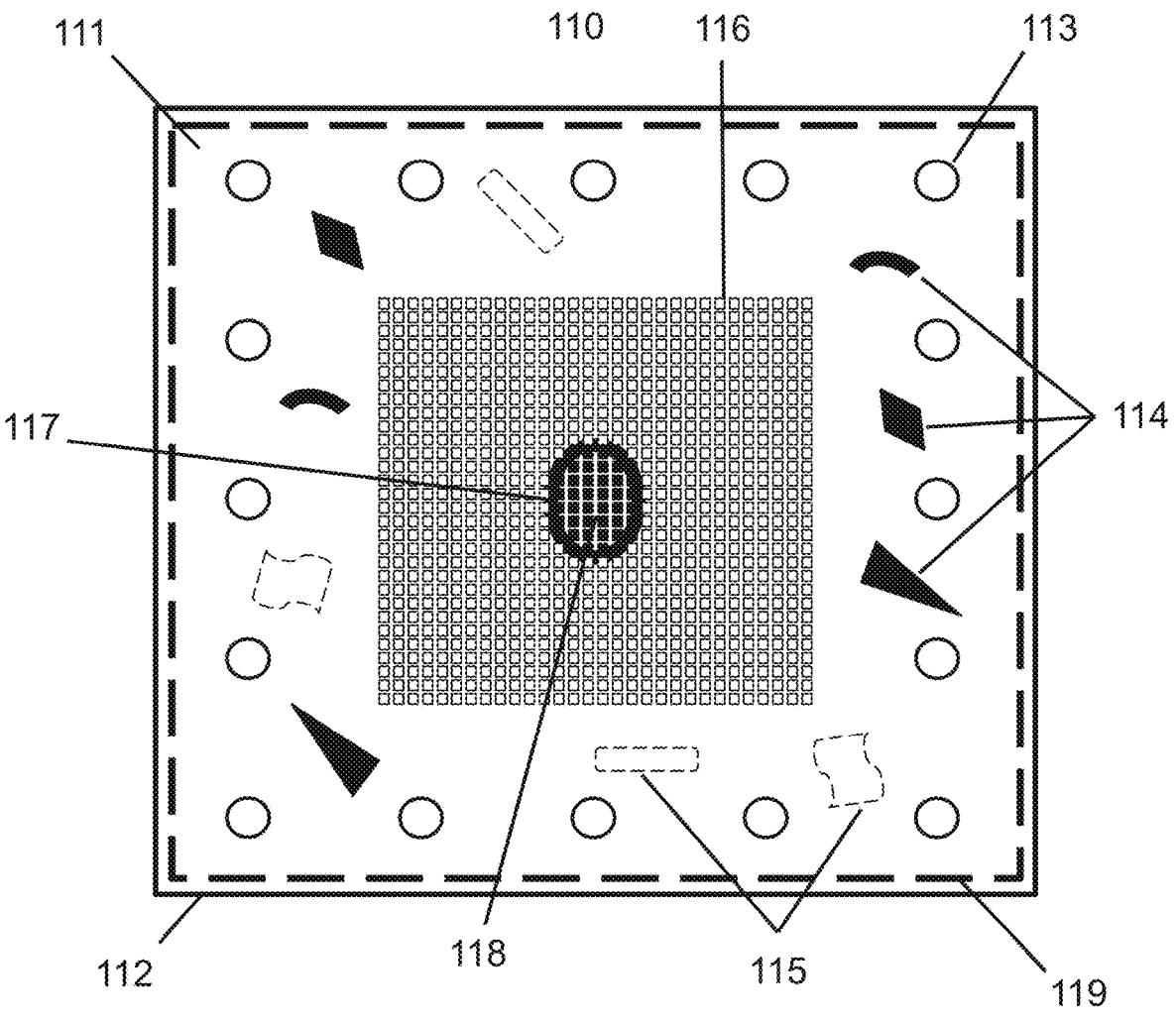

110 - Haptic System
111 - Haptic surface
112 - Periphery of haptic surface
113 - Actuator
114 - Channel decorrelator element which uses scattering
115 - Channel decorrelator element which uses dispersion 116 - Potential target pixel
117 - Boundary of fingertip which has been detected on the surface
118 - Pixels which are being targeted and transmitted to
119 - Sensor which detects location and extent of fingertip or body part in contact with haptic surface

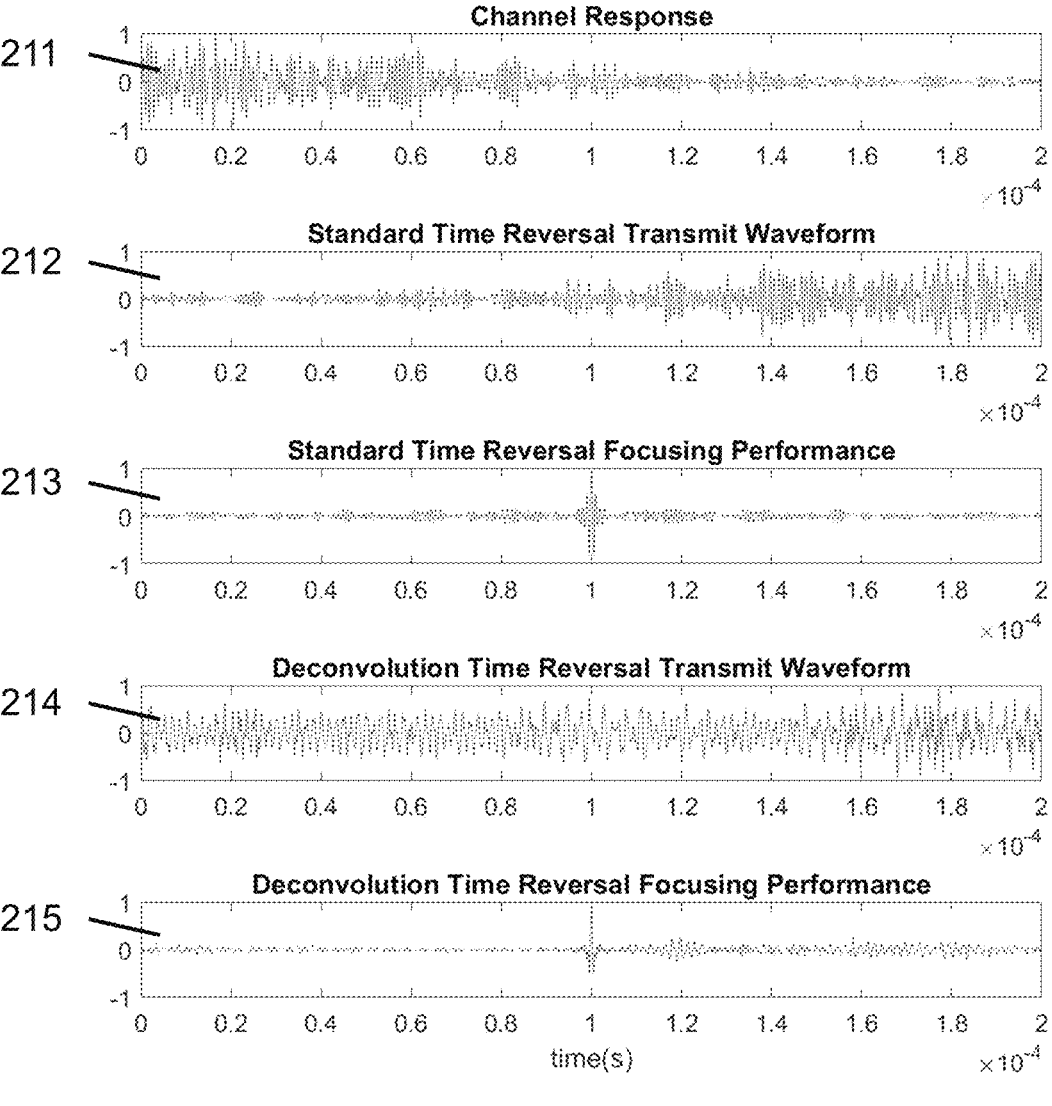

FIGURE 2A

211 - Channel impulse response between 1 actuator and 1 target pixel

212 - Transmit waveform generated using standard time reversal processing

213 - Displacement measured at target pixel in response to standard time reversal transmit waveform 214 - Transmit waveform generated using deconvolution time reversal processing of channel impulse response 215 - Displacement measured at target pixel in response to deconvolution time reversal transmit waveform 221 - Plot of the maximum pulse repetition rate which a targeted type of skin touch receptor can perceive
222 - Duration of time between pulses (delta t). delta t is used to determine the multiplexing ratio 230 - Example of a time division multiplexing frame structure 231 - Column of frame structure for each group of actuators 232 - Row of frame structure for each time slot 233 - Duration of time slot is set to be larger than the channel response duration 234 - Duration of frame is set to be less than the duration delta t 235 - Index of target pixel to be focused to within the specific slot 241 - Example Texture 1 temporal pattern of pulses to be transmitted to Pixel 10950
242 - Example Texture 2 temporal pattern of pulses to be transmitted to Pixel 12052

310

311 312

310 - Example area of the haptic surface detected by touch sensor to be transmitted to
311 - Each haptic pixel is a hexagonal region for equal spacing to all adjacent pixels
312 - Index of sub-carrier assigned to each pixel. Sub-carrier assignment is done to
maximize frequency separation between adjacent pixels 321 - Example sensitivity vs frequency of one types of skin touch receptor
322 - Example sensitivity vs frequency of one types of skin touch receptor
323 - Example of maximum frequency for receptor shown in 321
324 - Example of maximum frequency for receptor shown in 322

330

330 - Example frequency spectrum showing individual sub-carriers
331 - Center frequency of frequency division multiplexing scheme
332 - Individual sub-carrier
333 - Index number of individual sub-carrier
334 - Frequency separation between adjacent subcarriers selected to be greater than twice the maximum frequency targeted to be perceived by the skin touch receptor of 323 or 324

341 - Example Texture 1 pattern of amplitude and frequency to be transmitted to Pixel 11001
342 - Example Texture 2 pattern of amplitude and frequency to be transmitted to Pixel 11100

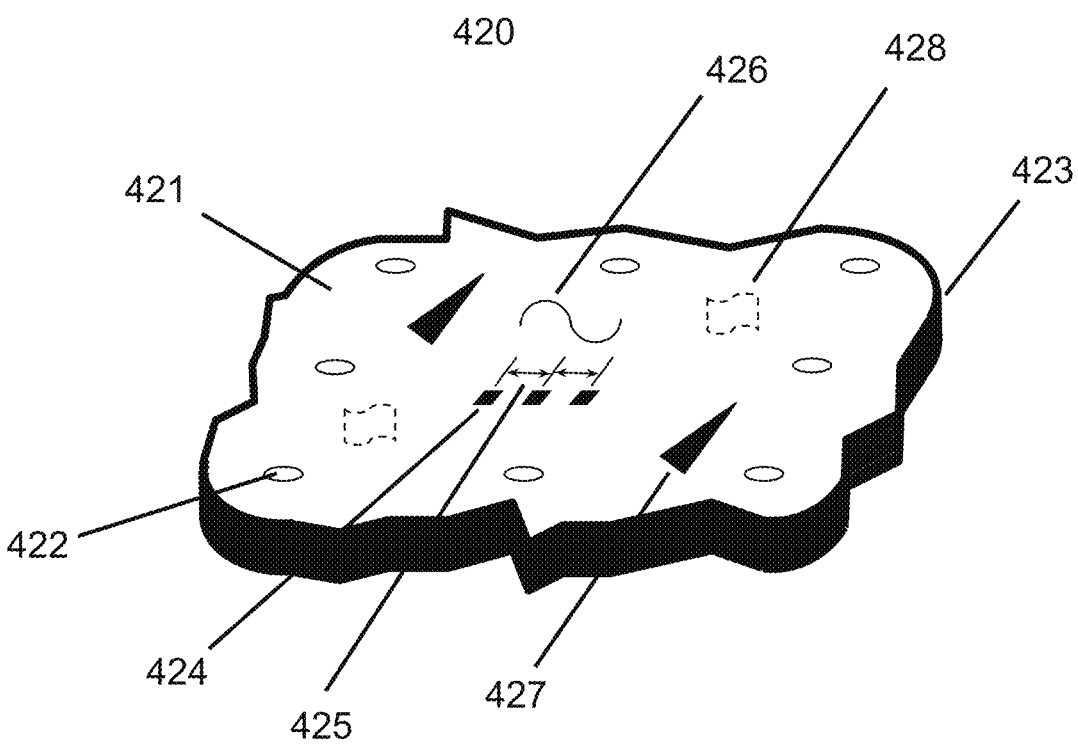

FIGURE 4B

420 - Example propagation layer of a haptic surface
421 - Material of propagation layer designed to support ultrasonic wave propagation
422 - Actuator
423 - Periphery around propagation layer comprising a second material selected for a difference in acoustic impedance from the material of the propagation layer 421 with a shape optimized to maximize decorrelation between adjacent pixels 424 - Potential target pixel
425 - Separation between potential target pixels selected to be less than the separation between touch receptors in skin 414
426 - Wavelength of wave propagating in medium
427 - Channel decorrelator element using scattering
428 - Channel decorrelator element using dispersion

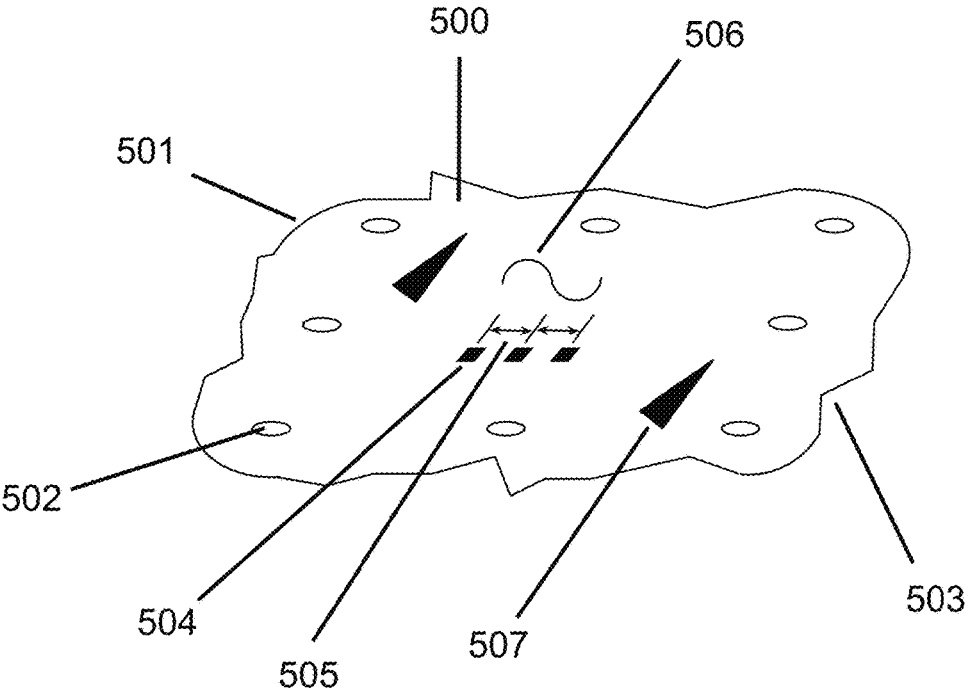

FIGURE 5

500 - Structural plate propagation layer of a haptic surface comprising a material which supports flexural modes
501 - Thickness of propagation layer significantly thinner than the wavelength of the waves propagating in the layer 506
502- Actuator
503 - Boundary shape of propagation layer designed to maximize decorrelation between adjacent pixels 504 - Potential target pixel
505- Separation between potential target pixels selected to be less than the separation between touch receptors in skin 414
506 - Wavelength of wave propagating in medium which is less than twice the separation between potential target pixels 505
507- Channel decorrelator element using scattering 610 - Example of a transient pulse arriving from the propagation layer at one side of the layer between the propagation layer and the finger
611 - Example of the transient pulse at another (finger) side of the layer between the propagation layer and the finger slowed by the layer

620

620 - Example anisotropic layer between propagation layer and finger
621 - Example cell of anisotropic layer
622 - Side of example cell which receives transient 610 from propagation layer
623 - Side of example cell which passes on slowed transient 611 to finger
624 - Example adjacent cell
625 - Example adjacent cell

700

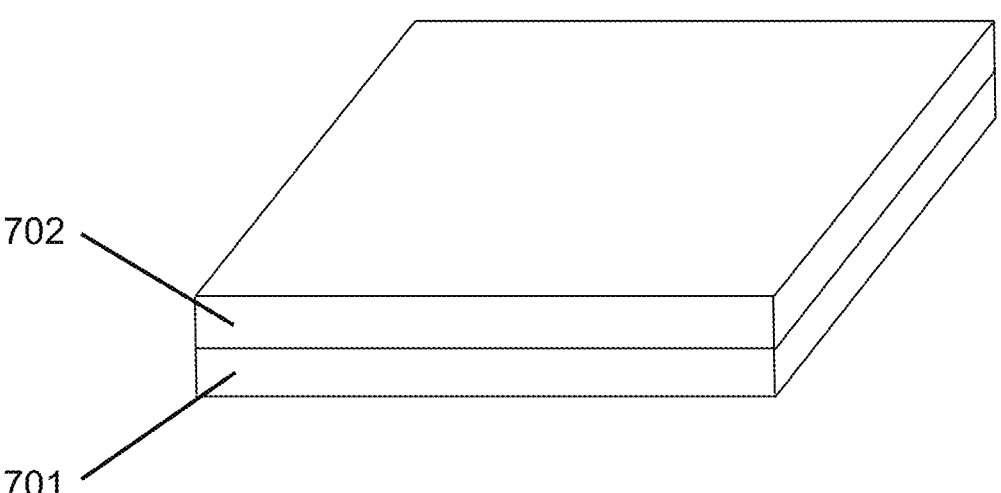

FIGURE 7

700 - Example section of a haptic surface
701 -Propagation layer of haptic surface comprising a material with one wave velocity for the frequencies of the wave propagation
702 - Layer between propagation layer and skin of the user comprising a material with a different wave velocity for the frequencies of the wave propagation selected to enhance acoustic radiation force momentum transfer

810

811

810 - Example section of layer of haptic surface designed to maximize nonlinear downconversion of passband frequencies to baseband frequencies
811 - Highly nonlinear elements within layer

820

821

823

822

820 - Section of haptic surface comprising regions with different properties
822 - A highly nonlinear element such as a microsphere
823 - Region which includes highly nonlinear elements such as microspheres

910

911

912

910 - Example section of haptic surface
911 - Propagation layer of haptic surface
912 - Elastic foundation comprising materials selected to prevent the
wave traveling in the propagation layer 911 from coupling into it

920

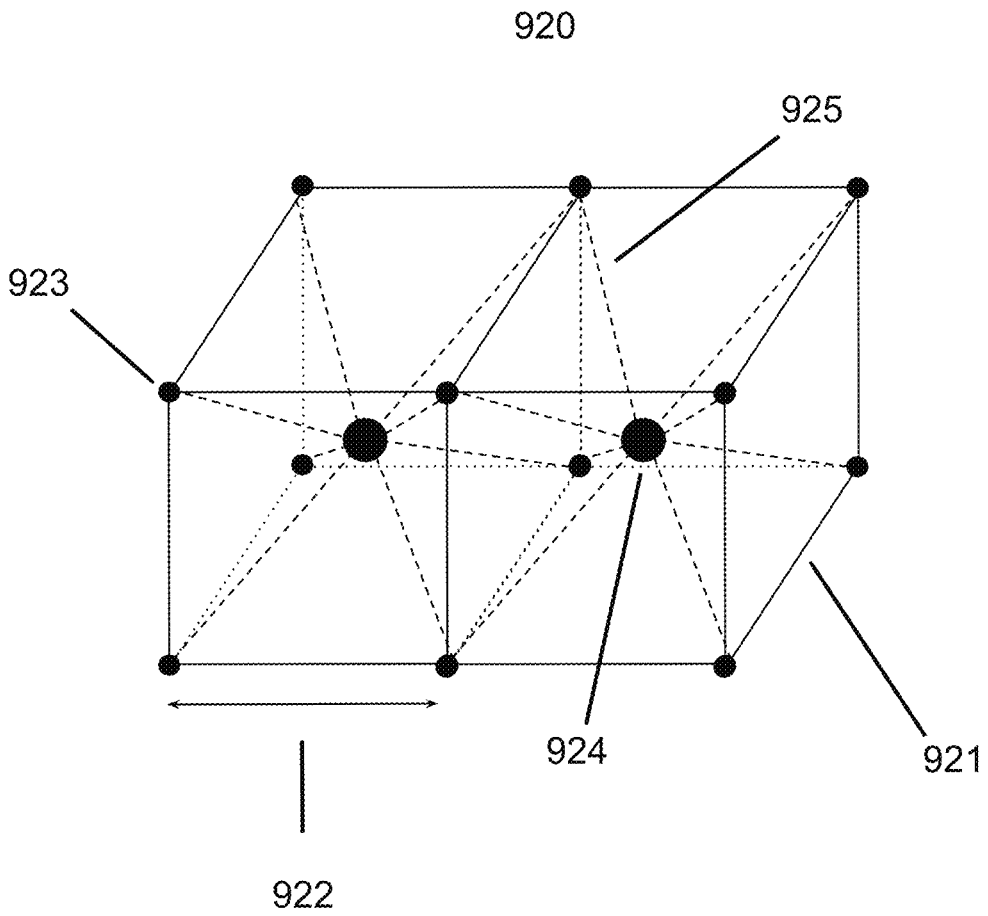

FIGURE 9B

920 - Example section of elastic foundation 912 in the form of a body centered-cubic elastic lattice which generates a phononic bandgap along various lattice vectors
921 - Coupling between next nearest neighbor sites
922 - Lattice parameter, defining the lateral distance between two unit cells, as well as the next nearest neighbor distance.
923 - Node of mass 1
924 - Node of mass 2
925 - Diagonal nearest neighbor couplings

930

931

933

932

934

930 - Example section of elastic foundation 912 in a general form of a phononic crystal and metamaterial which generates a frequency bandgap via Bragg diffraction or local resonance
931 - Material with one set of material properties
932 - Material with second set of material properties
933 - Unit cell
934 - Lattice parameter defining the side length of a unit cell

1000

1001

1002

1006

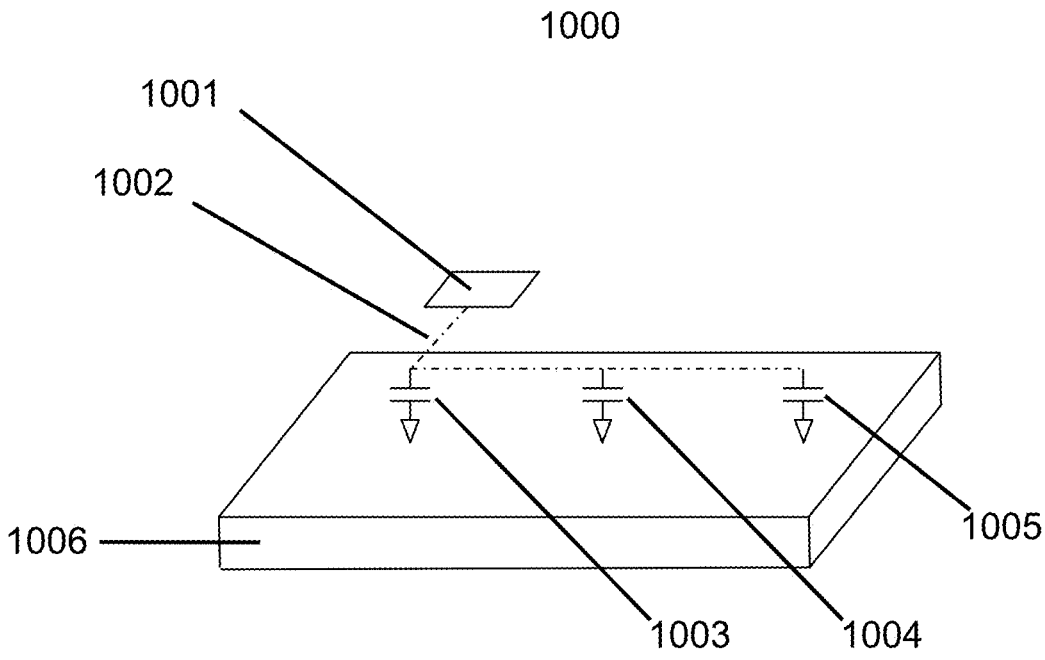

1000 - Section of embodiment of hardware showing a single transmitter drive circuit connected to a number of actuators in parallel
1001 - Driver for actuator
1002 - Wire connecting driver to array of transducers connected in parallel
1003 - Narrowband/High Q transducer element 1 at frequency 1 orthogonal to other transducer frequencies
1004 - Narrowband/High Q transducer element 2 at frequency 2 orthogonal to other transducer frequencies
1005 - Narrowband/High Q transducer element 3 at frequency 3 orthogonal to other transducer frequencies
1006 - Haptic surface

1102

1101

1103

1101 - Section of haptic surface
1102 - Actuator
1103 - Example PVDF film sensor capable of measuring ultrasonic vibration

1200

1203 ——————

1202 ——————

1201 ——————

1200 - Example application of system integrated with a touch screen
1201 - Visual graphics display
1202 - Touch sensor for measuring position, pressure and extent of body parts in contact with the system
1203 - Haptic surface that outputs tactile stimulation to the user's finger

1300

1300 - Example application of haptic system in a car
1301 - Location of haptic system integrated into
infotainment system touchscreen

1400

1402

1403

1401

1400 - Wrist worn device for generating tactile sensations through the wristband.
Sensations generated in the wristband can be designed to pair with words,
phonemes etc to allow the device to pass messages to a user
1401 - Puck of wrist worn device which includes all electronics of the haptic system
1402 - Actuator
1403 - Example potential target pixels in wristband Generating, by a plurality of actuators, mechanical waves in a haptic surface through control of each of the plurality of actuators

Figure 15:
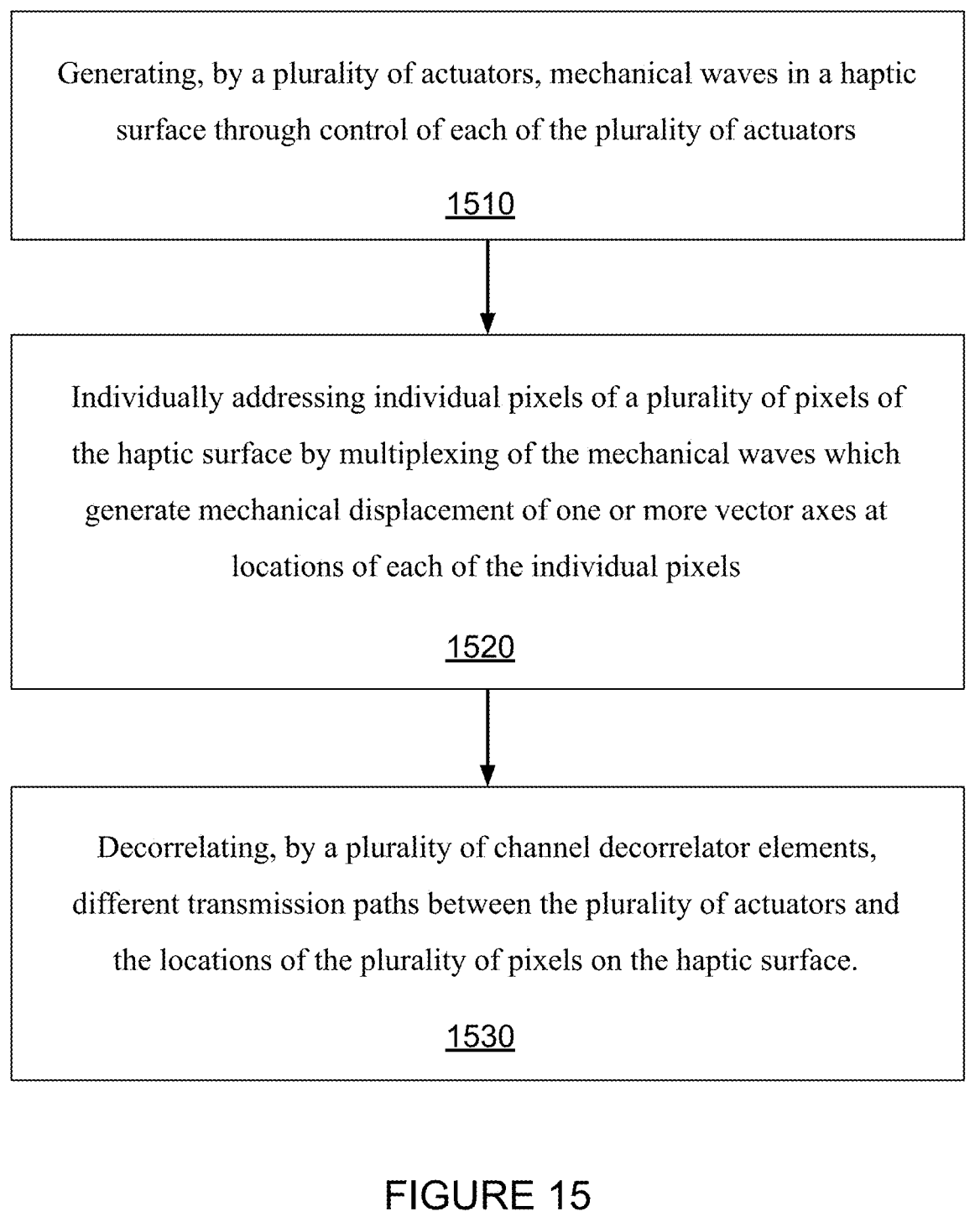

1510

Individually addressing individual pixels of a plurality of pixels of the haptic surface by multiplexing of the mechanical waves which generate mechanical displacement of one or more vector axes at locations of each of the individual pixels

1520

Decorrelating, by a plurality of channel decorrelator elements, different transmission paths between the plurality of actuators and the locations of the plurality of pixels on the haptic surface.

RENDERING FINE DETAIL SURFACE GEOMETRY ON AN ACTIVE SURFACE HAPTIC DISPLAY

RELATED PATENT APPLICATIONS

This patent application claims priority to U.S. Provisional Patent Application Ser. No. 63/689,669, filed Aug. 31, 2024, which is herein incorporated by reference.

FIELD OF THE DESCRIBED EMBODIMENTS

The embodiments described relate generally to displays. More particularly, the described embodiments relate to systems, methods, and apparatuses for rendering fine detail surface geometry on an active surface haptic display.

BACKGROUND

With approximately a quarter million receptors on the human body, the sense of touch is our second highest bandwidth sense. Despite this fact, there are very few devices capable of interacting with this sense. Haptic devices can coarsely be divided into those which rely on illusion and those which do not. Illusion based devices rely on other stimuli such as an audible click or a delayed buzz to trick the user into perceiving a given sensation by harnessing the user's expectation based on prior experiences. While these devices can provide compelling experiences they are limited in capability and for the sake of this disclosure are not considered amongst haptic displays.

The most basic haptic devices use actuators such as voice coil motors, linear resonant actuators, eccentric rotating mass vibration motors, electrodes or piezoelectric actuators and directly embed them into a tactile surface or wearable haptic device. While these devices are the most straightforward, the main challenge is that the size of the actuator is large relative to the size and pitch of the tactile receptors of the skin, stimulating large numbers of tactile receptors at once, thereby preventing it from rendering fine detail surface geometry. The type of actuators used for these devices typically have narrow frequency bandwidth or slow response times, limiting the type of sensations which can be generated. Additionally, there are scaling challenges as even if smaller actuators could be developed, to be able to generate sensations over a large area, thousands of actuators are required. This category includes everything from refreshable braille displays and haptic gloves to the vibration motors in phones and game controllers.

A second category of surface haptic devices separates the actuators from the point of contact of the skin using a fluid medium to transfer movement from source to target. In this category are microfluidic and electro-osmotic devices. This results in a thin haptic surface which can be integrated into existing devices like touchscreens, but it suffers from having a minimum haptic pixel size larger than the spatial acuity of human skin making it incapable of rendering fine surface geometry. Furthermore, the size and shape of the inflatable surface bubbles are fixed in manufacturing, limiting reconfigurability. Additionally, there is the scaling issue of needing an inflatable bubble and fluidic line for each haptic pixel.

A third category of surface haptic device works by modulating friction. This is either done using ultrasonic waves to 'lubricate' the area beneath the finger or electro adhesion or local heating to adhere the skin to the surface. These approaches are passive and so only provide haptic feedback in response to movement. This category of passive feedback is capable of rendering textures but has been shown in scientific studies to be poor at rendering fine surface geometry.

A fourth category of existing tactile displays is not a haptic surface display but instead uses beamforming over the air to focus vibrations in the ultrasonic frequency regime and then rely on the acoustic radiation force mechanism to down-convert the modulated vibration signals at the boundary of the air and skin. This method has been shown to be effective in creating virtual shapes in free space. The size of the shapes are large relative to the spatial acuity of the skin and the acoustic radiation force mechanism used in this case is inefficient, resulting in faint sensations and a short working distance.

A fifth category demonstrated at various universities uses an array of low frequency actuators attached to a surface which beamform to generate localized sensations at a fingertip in contact with the surface. In these examples the frequency of the waves used for beamforming (<1 kHz) result in large wavelengths multiple centimeters in length and therefore stimulate the entire fingertip with the same stimulus making it incapable of rendering fine surface geometry.

A sixth category proposed but not developed proposed placing phased array transducers around the periphery of a haptic display surface and using phased array techniques at ultrasonic frequencies to steer a number of beams through the haptic surface material to intersect at a location within the haptic display where local nonlinearity of the material down-converts the ultrasonic vibration frequency to a perceivable displacement frequency.

The systems and methods described herein operate in a similar category to this last category in that they utilize ultrasonic mechanical waves propagating through a surface but depart significantly in terms of the hardware design of the surface, type of actuators used, mode of wave propagation, mechanisms for wave control, resolution of haptic stimuli which can be created and the algorithms used to generate them.

It is desirable to have methods, systems, and apparatuses for rendering fine detail surface geometry on an active surface haptic display.

SUMMARY

An embodiment includes a system that includes a haptic surface, a plurality of actuators and a plurality of channel decorrelator elements. Each actuator is configured to generate mechanical waves in the haptic surface through control of each of the plurality of actuators, and wherein individual pixels of a plurality of pixels of the haptic surface are individually addressable by multiplexing of (either time or frequency of) the mechanical waves which generate mechanical displacement of one or more vector axes at locations of each of the individual pixels, wherein the plurality of channel decorrelator elements are located and configured to decorrelate different transmission paths between the plurality of actuators and the locations of the plurality of pixels on the haptic surface.

An embodiment includes a method including generating, by a plurality of actuators, mechanical waves in a haptic surface through control of each of the plurality of actuators, individually addressing individual pixels of a plurality of pixels of the haptic surface by multiplexing of the mechanical waves which generate mechanical displacement of one or more vector axes at locations of each of the individual pixels, and decorrelating, by a plurality of channel decorrelator elements, different transmission paths between the plurality of actuators and the locations of the plurality of pixels on the haptic surface.

Other aspects and advantages of the implementations described will become apparent from the following detailed description, taken in conjunction with the accompanying drawings, illustrating by way of example, the principles of the implementations described.

BRIEF DESCRIPTION OF THE DRAWINGS

FIG. 1A shows a haptic surface system, according to an embodiment.

FIG. 2A shows a sequence of waveforms for the steps of converting a channel response to a transmit waveform and the resulting focusing signal at a target of a time reversal process, according to an embodiment.

FIG. 4B shows an example of a propagation layer wherein a wavelength in the medium of the propagation layer is less than twice a target pixel spacing, with a periphery and channel decorrelator elements that have a shape to increase channel decorrelation, according to an embodiment.

FIG. 5 shows a structural plate propagation layer modeled using Kirchhoff or Mindlin theory, according to an embodiment.

FIG. 7 shows an example of a layer added to a propagation layer to enhance acoustic radiation force momentum transfer, according to an embodiment.

FIG. 9B shows a zoomed-in section of an example lattice capable of producing a phononic bandgap by a tailored arrangement of coupled masses, according to an embodiment. The propagation of certain wave frequencies are prevented due to coherent (Bragg) scattering effects. The bandgap frequency and bandwidth can be tailored by adjusting the mass values and mass ratio.

FIG. 10 shows a zoomed-in section of the haptic surface with three narrowband transducer elements in parallel and connected to a single transmit chain which represent an actuator of the plurality of actuators, according to an embodiment.

FIG. 15 shows steps of a method of haptic surface system, according to an embodiment.

DETAILED DESCRIPTION

Figure 1B:
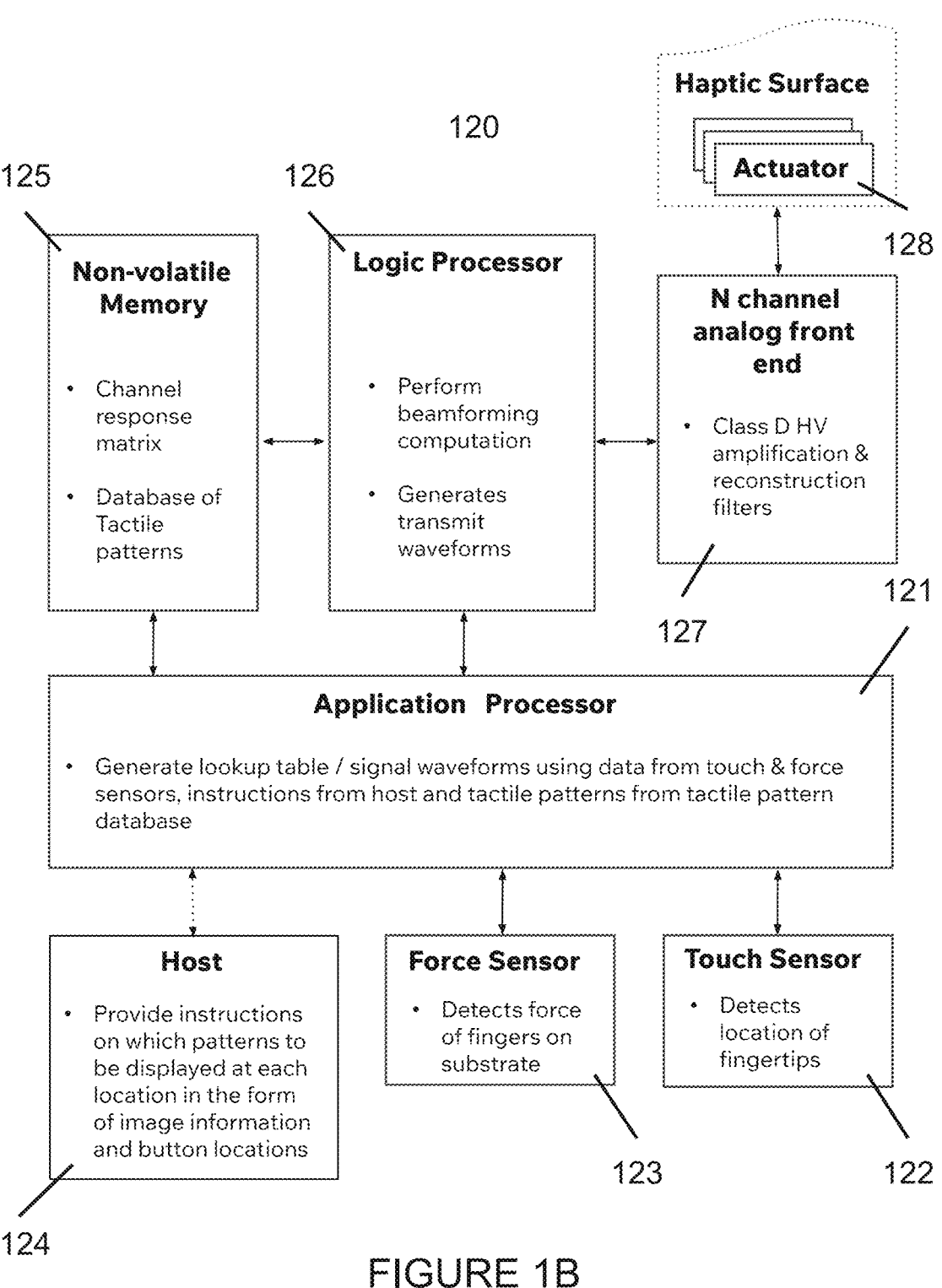
FIG. 1B shows hardware architecture for the haptic system, according to an embodiment.

At least some embodiments provide for rendering fine detail surface geometry on an active surface haptic display. The described embodiments include a tactile haptic surface display which can render fine detail surface geometry and textures at one or more human appendages (such as one or more fingers or other body parts) in contact with the haptic display surface at a resolution sufficiently high to match the spatial acuity of the touch sense receptors (mechanoreceptors) within the human appendage. For an embodiment, the display includes a haptic surface specially designed with tailored scattering and dispersion selected to maximize (enhance) beamforming performance and mechanical properties selected to optimize (reduce) loss and confine the waves in a desired layer at a target wavelength range. For an embodiment, the haptic display includes a number of electromechanical actuators around the periphery or to one side which send mechanical waves at an ultrasonic frequency through the medium, focusing to points smaller than a pitch between tactile receptors in the skin. At least some embodiments include frequency division multiplexing or time division multiplexing to increase the number of active targeted haptic pixels (also simply referred to here as pixels). Spatio-temporal patterns are played over the haptic pixel array, emulating surface geometry, textures and apparent motion. Beamforming is a signal processing technique that directs waves, such as electromagnetic or mechanical waves, towards a specific target, improving signal quality, range, and reducing interference. It involves manipulating the phase and amplitude of each signal path between each antenna or actuator elements and a target to create constructive interference in the desired direction and destructive interference elsewhere, effectively focusing the wave energy.

FIG. 1A shows a haptic surface system 110, according to an embodiment. As shown, the haptic system 110 includes a haptic surface 111 with periphery 112, and a plurality of actuators 113. For an embodiment, each actuator 113 is configured to generate mechanical waves in the haptic surface 111 through control of each of the plurality of actuators 113. For an embodiment, the haptic surface 111 includes a plurality of potential target pixels 116 that can be targeted or transmitted to by the plurality of actuators with the generated mechanical waves. For an embodiment, individual pixels of a plurality of targeted pixels 118 of the haptic surface 111 are individually addressed by multiplexing of (either time or frequency of) the mechanical waves which generate mechanical displacement of one or more vector axes (that is, three-dimensional x, y, z axis) at locations of each of the individual pixels of the plurality of targeted pixels 118. For an embodiment, the haptic surface system 110 further includes a plurality of channel decorrelator elements, wherein the plurality of channel decorrelator elements 114 and 115 using scattering and dispersion respectively, are located and configured to decorrelate different transmission paths between the plurality of actuators 113 and the locations of the plurality of targeted pixels 118 on the haptic surface 111.

For an embodiment, the pixels of the plurality of pixels of the haptic surface 111 may be physically contacted by a human body part, such as a human finger which contacts the haptic surface 111 at an area 117. As will be described, for an embodiment, the mechanical waves are formed to target pixels 118 of the region 117.

For an embodiment, the system is further configured to include calibration of the haptic surface to generate a channel response matrix between each of the plurality of actuators and each of the plurality of potential target pixels 116. For an embodiment, each of the plurality of pixels are individually addressable through time division multiplexing of the mechanical waves. For an embodiment, each of the plurality of pixels are individually addressable through frequency division multiplexing of the mechanical waves.

For an embodiment, a sensor 119 is utilized to measure a location and extent 117 of the fingertip or other body part in contact with the haptic surface to determine which of the plurality of potential pixels 116 to target. The sensor may be a capacitive touch sensor, resistive touch sensor, force sensor or other sensor placed in a layer beneath the haptic system which detects the proximity, contact or pressure of the fingertip or other body part in contact with the haptic surface. Or it may be an optical sensor or other sensor placed on the periphery of the haptic surface to detect the contact of the finger or other body part.

In some embodiments the area of a finger pad 117 encompassing target pixels 118 may be 10×10 mm to 15×15 mm in size. In some embodiments, the haptic system can additionally be designed to support multi-touch with multiple finger contact areas active at a given time. For an embodiment, the maximum haptic pixel density (i.e. the spacing between potential target pixels 116) required to mimic surface geometry for a fingertip is around 100 haptic pixels per square centimeter, but for some embodiments, a density as low as 25 pixels per square centimeter can suffice for certain applications.

For an embodiment, a lookup table is generated for each of the plurality of actuators for each time slot of the time division multiplexing which identifies which target pixel to address by retrieving instructions. For an embodiment, the instructions inform which tactile pattern is to be sent to each potential target pixel, wherein the tactile pattern is one of a plurality of tactile patterns, wherein each tactile pattern defines a spatio-temporal pattern associated with a specific surface geometry or texture. In some embodiments the spatio-temporal pattern is generated in real-time based on an algorithm which utilizes real-time information from the touch and force sensors tracking its trajectory along with algorithms for each desired tactile pattern. The tactile patterns determine, for example, a texture that a human finger feels when contacting the targeted pixels. For an embodiment, the corresponding time slots of the lookup table are assigned to the appropriate target pixel by extracting from a database the spatio-temporal pattern associated with the selected tactile pattern.

The soft tissue mechanics of a human fingertip cause external forces to propagate through the skin in complex ways, exciting four main classes of mechanoreceptors (SA1, SA2, FA1, FA2), each tuned to different spatial and temporal properties of skin deformation. These receptors respond not to steady pressure alone, but to changes, especially rapid ones in mechanical stress and strain. Critically, fast adapting (FA) receptors encode dynamic touch events. FA2 Pacinian corpuscles are highly sensitive to broad frequency (60-800 Hz), brief (0.1-100 ms), mechanical events, while FA1 Meissner corpuscles are particularly efficient in transducing information about relatively low-frequency vibrations (30-50 Hz) that occur when textured objects are moved across the skin, or the tensile and compressive strain skin dynamics that emerge as an object moves into partial slip from initial contact before sliding across the skin.

Tactile perception as a whole includes the process of sensing the consequences of physical contact between a body part (for example, a finger) and the environment, which arises from the dynamic deformations of the skin, detected by mechanoreceptors embedded in soft tissue and interpreted by the brain. These skin-object interactions allow humans to infer critical physical properties such as the shape, texture, compliance, friction, and material properties of the objects in contact with the skin. The mechanoreceptors do not simply relay static data; instead, the brain actively reconstructs object properties by integrating signals across time and space, linking perception tightly with exploratory motor behavior.

Many common skin-object interactions are characterized by brief events. This is evident not only in brief actions like knocking on a door, tapping on a surface, or typing on a keyboard, but also in dynamic sliding skin-object interactions such as when reading Braille or exploring textured surfaces with a fingertip. This is because these skin-object interactions consist of a series of brief impacts as the skin contacts various textural elements. Therefore, transient perturbations of the skin can be treated as tactile building blocks. These brief, high-fidelity mechanical signals can encode spatial and temporal gradients, making them ideal primitives for reconstructing dynamic touch.

The use of normal-to-the-skin transient stimuli opens a powerful, underutilized method for generating tactile feedback. In cases where the optimal duration for a stimulus is much longer than what can be delivered natively with transients, a profile using a train of discrete mechanical transient events can be created. In this way all dynamic tactile interactions can be decomposed into spatio-temporal patterns, systematically reconstructing complex sensations such as texture, geometry, material quality, and interactive surface elements, to create a programmable, scalable, and perceptually robust interface for simulating rich tactile experiences.

In order for transients to mimic tactile feedback expected by the brain, the feedback should obey the dynamics of the probing finger movement i.e. updating relative to finger loading (N) with the spatial power spectrum shifting as position (x, y) varies and modeling the expected spatio-temporal patterns across many orders of magnitude of time scales from 100s of microseconds for brief impacts, to seconds for sliding interactions. To achieve this in practice in some embodiments, touch sensor 122 of FIG. 1B must be able to track finger position (x, y) and update at a rate of 180 mm/sec and force sensor 123 must be able to extract finger loading forces ranging from 0.1-15N in the normal direction.

Displacements generated by the haptic system 110 at each of the targeted pixels 118 must be greater than the absolute detection threshold of perception. Adjusting the amplitude of transients delivered to each targeted pixel 118 may in some embodiments be accomplished by assigning a scaling factor to each transient at the application processor 121 of FIG. 1B.

The absolute detection threshold of perception defines the lower bound of tactile sensitivity, typically measured as the smallest skin displacement at which a stimulus becomes perceptible. For the human fingertip, this threshold is approximately 1 micron of normal skin displacement. While this value serves as a useful benchmark, it represents only a part of a more complex picture, with multiple distinct mechanical inputs capable of producing the same skin displacement. This ambiguity reflects the diversity of tactile interactions in natural environments, where biologically relevant stimuli often arise from transient mechanical events i.e.) brief impacts, rapid deformations, or subtle textural vibrations, rather than continuous or sinusoidal inputs. A 1 micron displacement can result from: a 200 Hz sinusoidal oscillation lasting one second; A brief impact with a 0.05 millisecond duration; a compound impulse event from surface texture contact during sliding, or even a low-frequency, high-amplitude pulse with significant damping. Despite producing the same magnitude of displacement, these stimuli differ dramatically in spectral content, energy distribution, and spatio-temporal structure, all of which shape the perceptual outcome. The nervous system resolves this ambiguity by integrating contextual cues, prior experience, and ongoing motor activity to interpret the likely source and meaning of the stimulus. Thus, while a 1 micron threshold serves as a biomechanical constant, the pathway by which this displacement is achieved, its dynamics, critically determines what is perceived. This underscores the importance of controlling not just displacement magnitude, but also its temporal profile and spatio-temporal distribution, when designing tactile patterns.

A database of tactile patterns will be stored in non-volatile memory 125 of FIG. 1B. In some embodiments, these patterns may include fixed patterns i.e. patterns which are static spatio-temporal patterns which may simply be scaled in amplitude but map to a fixed location on the display with a defined temporal pattern such as the examples shown in FIG. 2D assigned to each potential target pixel 116. Alternatively, in some embodiments, tactile patterns may include specific algorithms which generate a custom tactile pattern for each pixel based on real-time input from the loading forces measured by the force sensor 123 and the speed of fingertip movement measured by touch sensor 122 and the desired tactile display image information received from the host processor 124. For either scenario, representing various real world interactions through tactile patterns will follow a number of principles as described in the following paragraphs.

In some embodiments, edges, corners, and geometrical features can be considered to comprise a sudden change in surface height or slope that leads to abrupt changes in force during contact, which are experienced as discontinuities in pressure and localized transients. Therefore, delivering a single sharp transient at the location of an edge, or a gradient of impulses for a slope, reconstructs the perception of a bump, ridge, or boundary. When the gradient goes from negative to positive along the x-y directions, the brain interprets an edge. In one example, a sharp vertical impulse followed by no further activity signals an edge. In another example a train of growing amplitude transients simulates a rising slope.

In some embodiments textures can be modeled as a series of micro-collisions of each part of the skin making contact with various surface asperities creating a train of spatially localized impulses. Each impulse's timing, spacing, amplitude, and decay profile corresponds to a texture's spatial frequency and roughness. By reproducing this impulse train over a dense array, textures independent of finger movement direction or speed are simulated. In one example cork and wood produce distinct impulse trains due to their differing hardness, friction, and surface grain which can be recreated by varying the impulse rate (spatial frequency) and bandwidth (temporal spread of force).

In some embodiments the mechanical act of pressing a button is modeled by responding to the force of the finger as measured by the force sensor 123 with a series of steps including an impulse in response to the initial contact, followed a series of transients in the form of a spatio-temporal pattern with the spectrum modeling the resistance and compliance of the button, followed by a break through click with a release and rebound modeled with a different spatio-temporal pattern. In some examples simulating a rubbery vs springy button can be achieved by altering the duration and decay shape of the impulses of the spatio-temporal pattern, thereby encoding the softness.

In some embodiments the identity of a material can be simulated for example glass, metal, plastic or wood by emulating the frequency content or temporal microstructure which is generated by the skin interaction with each type of surface. In some examples, glass produces fast decaying transients while cork yields slower decay due to the damping of the material.

In some embodiments, just as a 3D shape can be visually inferred from shading gradients, tactile shape can be inferred from gradients in force and deformation. A spatial gradient of transients (e.g., small to large to small impulses) can encode hills, valleys, curves. The layout of transients across the contact area can recreate local curvature and overall geometry. In one example, a domed bump can be encoded by delivering larger transients near the center of the contact area and smaller ones at the periphery.

An embodiment 120 includes an application processor 121 which receives finger location and extent data from a touch sensor 122 to determine which of the potential target pixels 116 to target, along with the force data from a force sensor 123 to determine what type of tactile pattern to display. For an embodiment, the application processor communicates with a host device 124 (either locally or remotely over USB or Bluetooth etc.) to receive the displayed image data, locations of buttons, desired textures etc. For an embodiment, the application processor then down-samples the displayed image data based on the ratio of a visual display pixel pitch to a haptic pixel pitch and based on a location of a button, texture and image data and the current location of the finger along with the past trajectory of the finger convert it into a desired target spatio-temporal pattern in the form of a lookup table or set of signal waveforms using information from the database of tactile patterns in non-volatile memory 125. For an embodiment, the application processor then sends this data to a logic processor such as an FPGA (field programmable gate array) or ASIC (application specific integrated circuit). The logic processor 126 takes this information and pulls the corresponding channel responses from the channel response matrix in non-volatile memory 125 and computes the beamforming waveforms and then computes the appropriate PWM signal compatible with the attached high voltage class D amplifiers of analog front end 127 which are connected to the plurality of actuators 128.

At least some embodiments utilize a generated lookup table to identify which channels from the channel response matrix are to be used. For an embodiment, a corresponding channel response is inverted to generate beamforming transmit waveforms to be transmitted from each of the plurality of actuators.

In some embodiments, transient based beamforming is used. In some other embodiments continuous wave beamforming approaches are used. Transient based beamforming which includes time division multiplexing provides a number of advantages over continuous wave beamforming approaches associated with frequency division multiplexing when channel decorrelators are used. One significant advantage is pulse compression. In a scenario with significant decorrelation between adjacent pixels and a low peak to average power ratio for transmit waveforms, the transient based beamforming approach can deliver spatial focus with just a single actuator. Further, the peak amplitude delivered at the focal point at the focal time comprises energy from the entire transmit duration, delivering significantly larger peak amplitudes for the same actuator displacement.

Figure 2B:
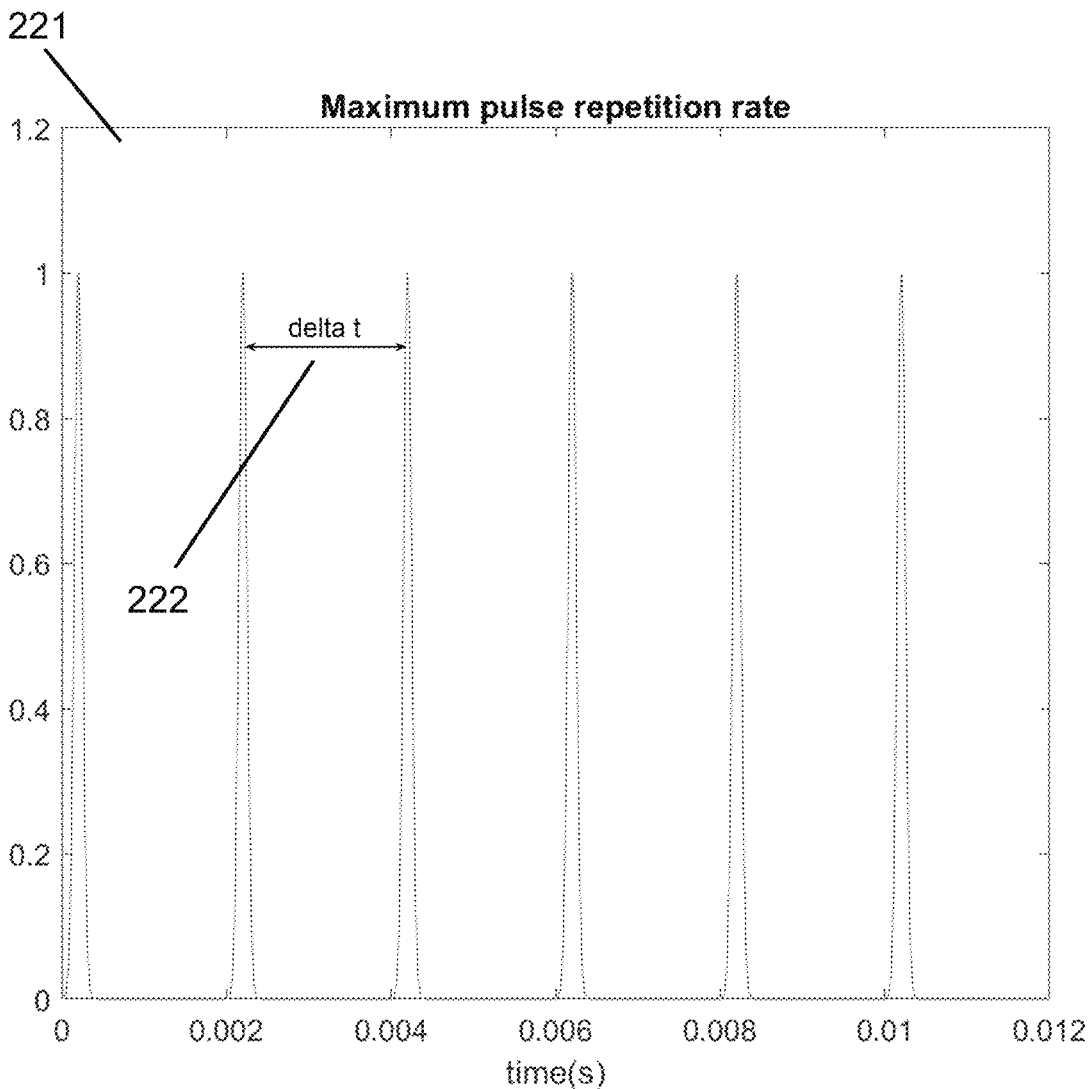
FIG. 2B shows an example of a highest pulse repetition rate which can be perceived by an example receptor for use in determining a time division multiplexing ratio, according to an embodiment.

For at least some embodiments, the beamforming transmit waveforms are generated using time reversal processing, comprising computing the beamforming transmit waveforms through deconvolution, and wherein a multiplexing ratio of the time division multiplexing is determined from a ratio of a haptic surface channel response duration, wherein the haptic surface channel response duration includes a longest duration for a signal to attenuate to a fraction of its maximum received signal for any of potential target pixels from any of the plurality of actuators, and a shortest duration between pulses intended to be perceived at target skin touch sense receptors, greater or equal to the shortest duration between pulses which a targeted type of skin touch receptor can perceive. FIG. 2A shows a channel response duration 211, and FIG. 2B shows the shortest duration (delta t) 222 between pulses which can be perceived.

FIG. 2A shows a sequence of waveforms for the steps of converting a channel response to a transmit waveform and the resulting focusing signal at a target of a time reversal process, according to an embodiment of transient based beamforming. FIG. 2A shows a channel impulse response 211 between one actuator and one target pixel, the duration of which is used to determine the time division multiplexing ratio. FIG. 2A shows a transmit waveform 212 generated using standard time reversal processing of the channel impulse response. FIG. 2A shows a displacement 213 measured at a target pixel in response to the standard time reversal transmit waveform. FIG. 2A shows a transmit waveform 214 generated using deconvolution time reversal processing of the channel impulse response. FIG. 2A shows displacement 215 measured at the target pixel in response to the deconvolution time reversal transmit waveform.

For some embodiments, the transient beamforming transmit waveforms are used in conjunction with a time division multiplexing scheme wherein a multiplexing ratio of the time division multiplexing is determined in part from the haptic surface channel response duration as shown in example 211 of FIG. 2A, wherein the haptic surface channel response duration includes a longest duration for a signal to attenuate to a fraction of its maximum received signal for any of potential target pixels from any of the plurality of actuators.

FIG. 2B shows an example plot 221 of a highest pulse repetition rate (i.e. 1/delta t) which can be perceived by an example skin touch receptor where 222 delta t is shown as the shortest time between pulses. For some embodiments which include a touch layer (described later in this document) which slows the transient pulses received from the propagation layer, the duration 222 delta t will be the shortest time between slowed pulses which can be perceived by an example skin touch receptor. For some embodiments, the multiplexing ratio of the time division multiplexing scheme is determined in part from the shortest time between pulses which the application is intended to provide which is greater than or equal to delta t.

Figure 2C:
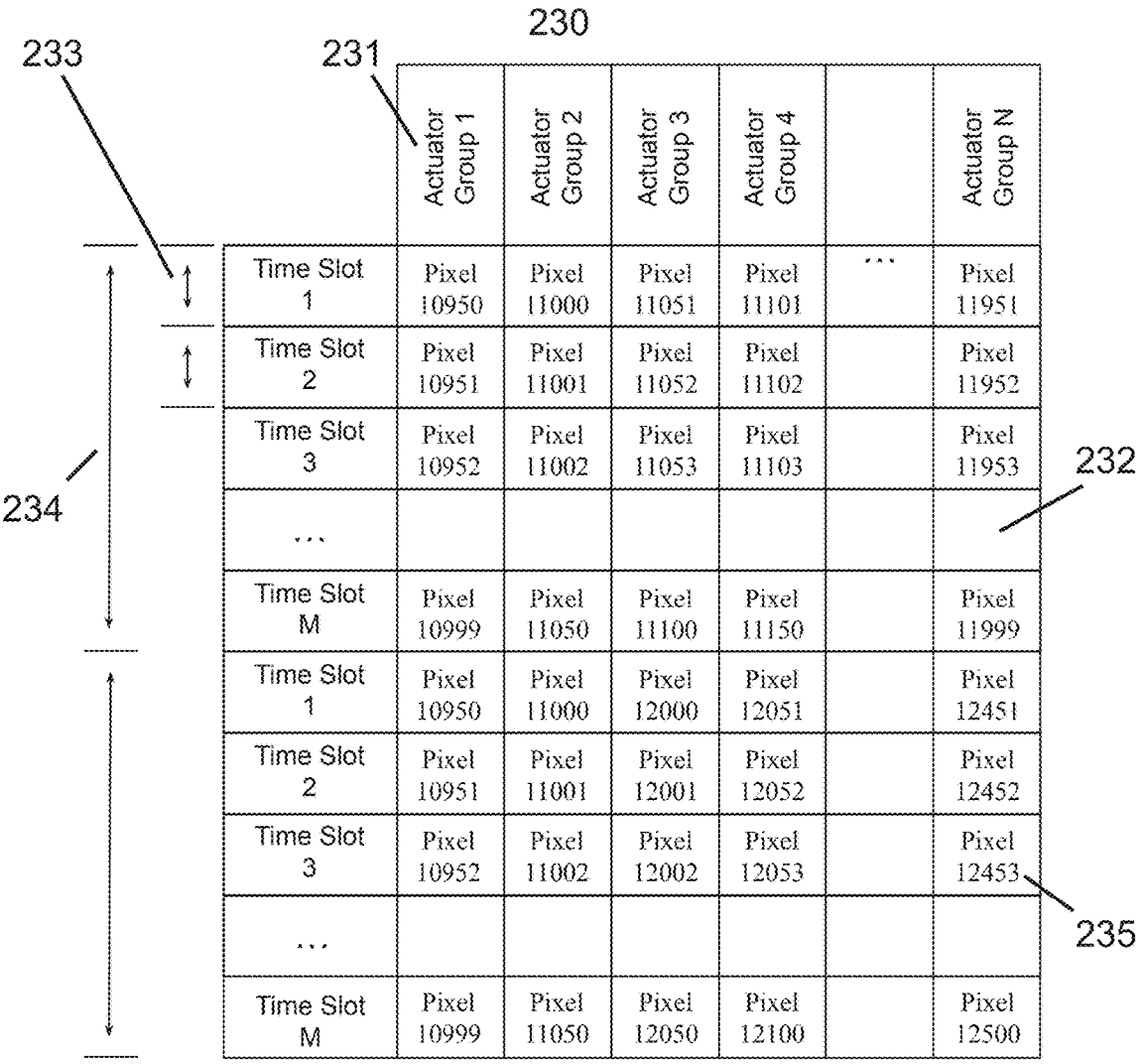
FIG. 2C shows an example generated lookup table frame structure of the time division multiplexing which assigns which target pixel is to be transmitted to by each group of actuators in each time slot, according to an embodiment.

FIG. 2C shows an example 230 of a generated lookup table of the time division multiplexing which assigns which target pixel is to be transmitted to by each group of actuators in each time slot, according to an embodiment. In many cases, more than one actuator can target a given target pixel within a time slot to increase the amplitude of the transient received by that pixel within the time slot, hence each actuator will be assigned to a group which targets the same pixels together. A group of actuators is represented by each column 231 of the time division multiplexing frame structure 230. Each time slot is represented by a row 232 of the time division multiplexing frame structure 230. For an embodiment, a duration 233 of each time slot is set to be larger than the channel response duration shown in example 211 of FIG. 2A. For an embodiment, a duration 234 of the frame is set to be less than the duration delta t of the desired maximum pulse repetition rate 222 of FIG. 2B. FIG. 2C shows an example slot 235 where target pixel index number 12453 of the plurality of potential target pixels 116 is to be focused to within the specific time slot 3 by the specific actuator group N.

In some embodiments, the frame rate defined as one over the duration of a frame 234 may be an order of magnitude higher than the maximum perceptual pulse repetition frequency, defined as one over the minimum duration between pulses 222 (delta t) of FIG. 2B which can be perceived. In one example, the frame rate is 5 kHz and the maximum perceived pulse repetition rate is 500 Hz, so the number of active pixels which can be addressed from for example, each actuator group 231 within each frame duration 234 is 10. Additionally, in cases where a targeted pixel is to be targeted with a lower than maximum pulse repetition rate, that specific time slot for that specific actuator group can be even further multiplexed increasing the number of pixels served from each group of actuators.

Figure 2D:
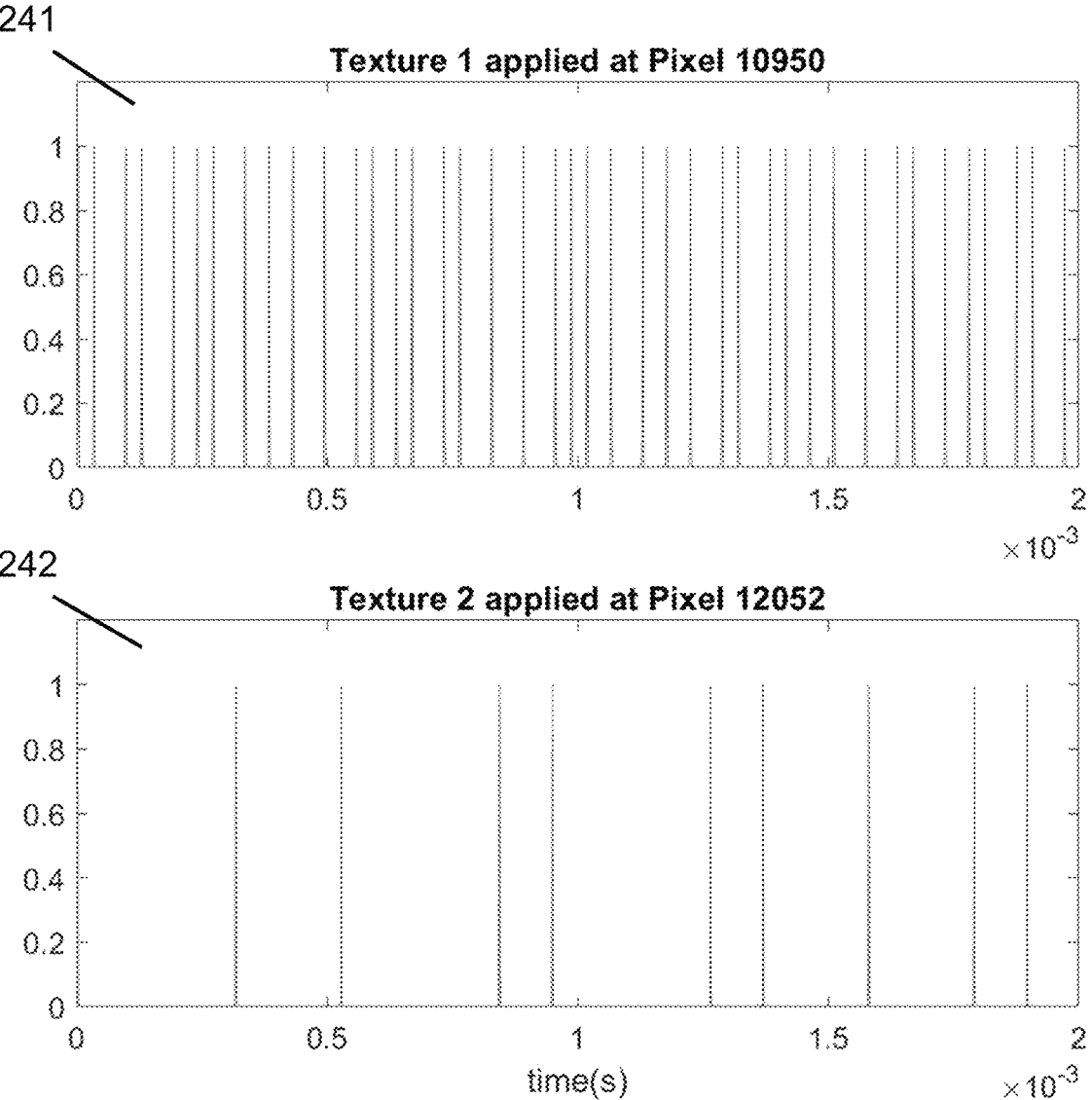
FIG. 2D shows two specific temporal patterns transmitted to two different target pixels within a spatiotemporal pattern, according to an embodiment.

FIG. 2D shows two example temporal patterns to be played at two target pixels within a spatiotemporal pattern, according to an embodiment. FIG. 2D shows an example texture 1 pattern 241 of pulses to be transmitted to, in one example, pixel index number 10950 of the plurality of potential target pixels 116. FIG. 2D further shows an example texture 2 pattern 242 of pulses to be transmitted to, in one example, pixel index number 12052 of the plurality of potential target pixels 116.

In some other embodiments continuous wave beamforming approaches are used where each of a plurality of targeted pixels 118 are individually addressed through frequency division multiplexing of the mechanical waves where frequency sub-carriers of the frequency division multiplexing are assigned to each of targeted pixels.

Figure 3A:
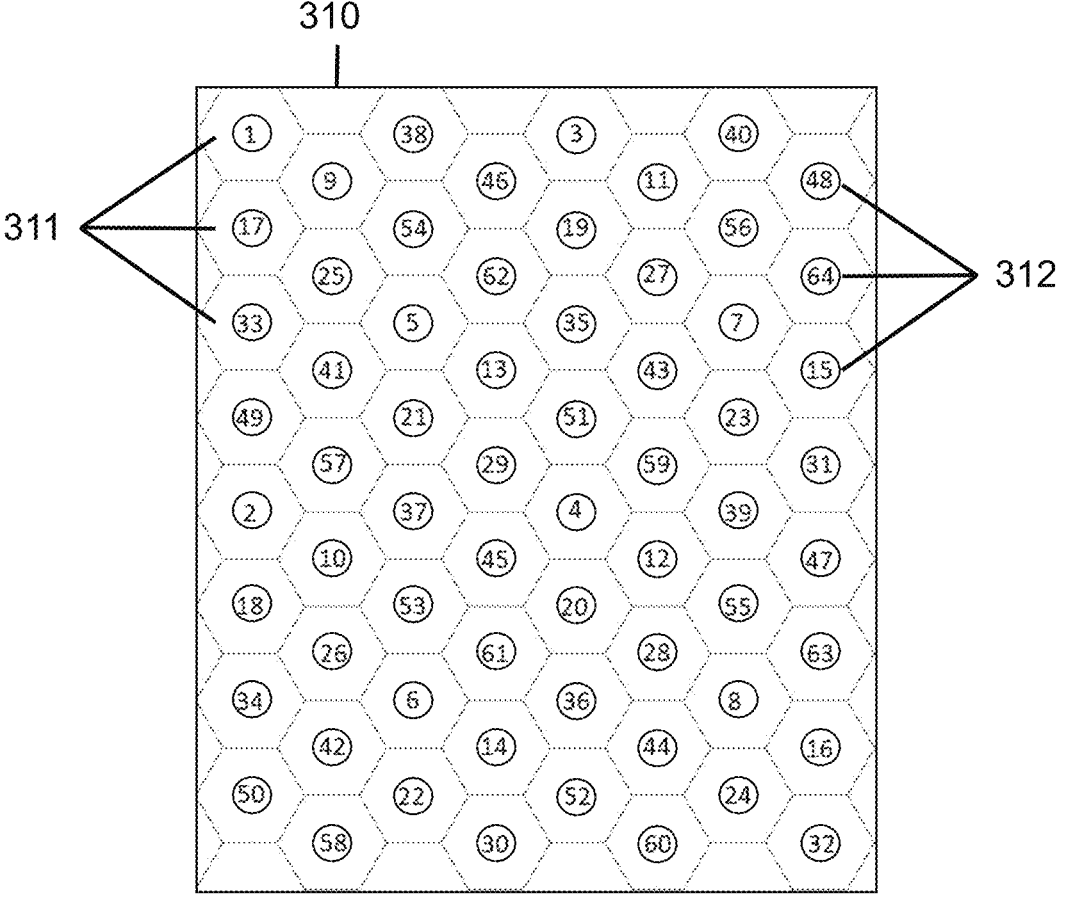
FIG. 3A shows a hexagonal pattern of haptic pixels with subcarriers assigned to increase physical separation between adjacent sub-carrier frequencies, according to an embodiment.

FIG. 3A shows a hexagonal pattern of haptic pixels with subcarriers assigned to increase physical separation between adjacent sub-carrier frequencies, according to an embodiment. FIG. 3A shows an example area 310 of a haptic surface detected by the touch sensor 122 where pixels are to be targeted, where each haptic pixel 311 is a hexagonal region with equal spacing to all adjacent pixels. Exemplary indices 312 indicate which sub-carriers indices are assigned to each pixel. For an embodiment, the sub-carrier assignment is made to maximize (enhance) frequency separation between adjacent pixels to increase the channel decorrelation.

Figure 3B:
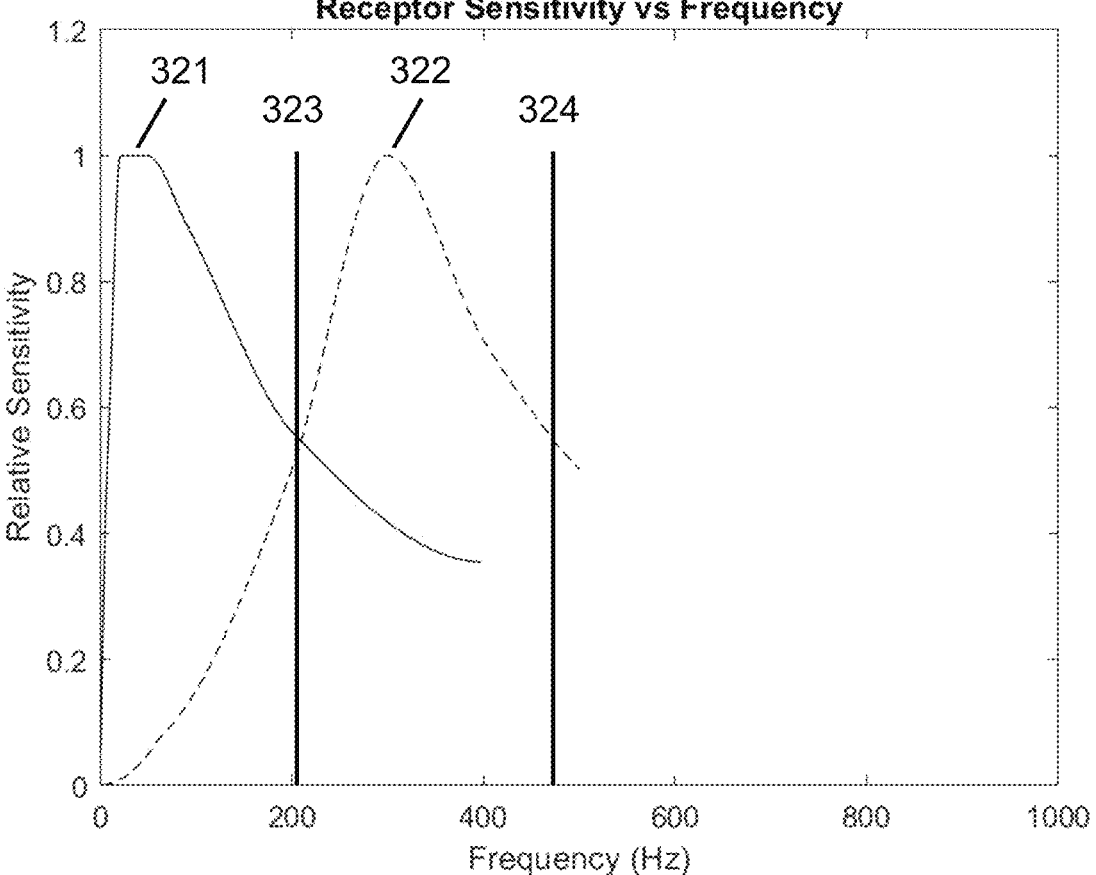
FIG. 3B shows examples of two types of skin touch receptor perceptual frequency responses and the associated maximum target frequency for each, according to an embodiment.

FIG. 3B shows examples of two types of skin touch receptor perceptual frequency responses and the associated maximum target frequency for each, according to an embodiment. Example 321 of sensitivity versus frequency of one type of skin touch receptor (mechanoreceptor) such as a meissner corpuscle. Example 322 of sensitivity versus frequency of another type of skin touch receptor such as a pacinian corpuscle. FIG. 3B shows an example 323 and 324 of the maximum frequencies used for transmission to the skin touch receptors of example 321 and 322 respectively.

Figure 3C:
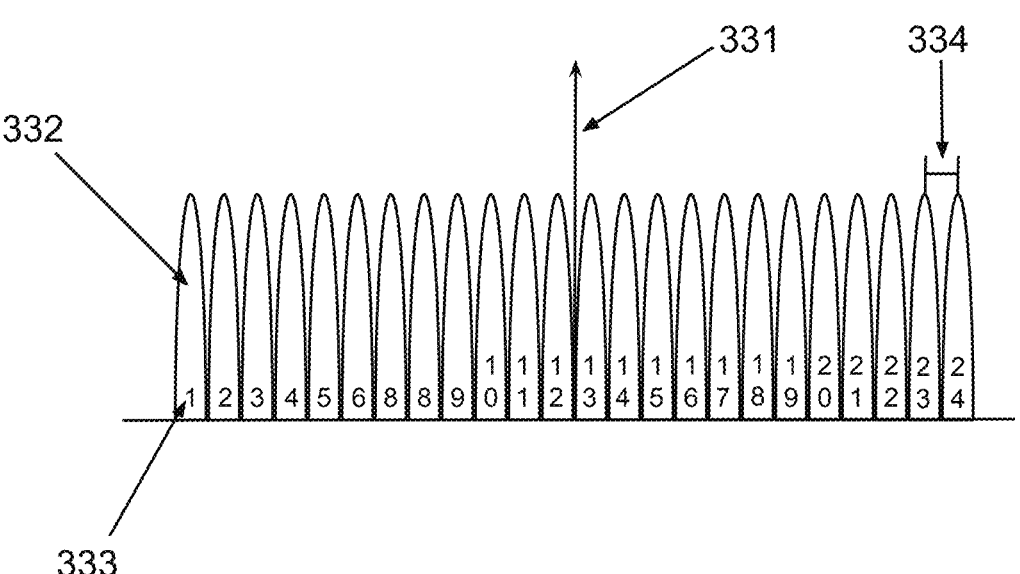
FIG. 3C shows an example sub-carrier map where the frequency separation is twice the maximum targeted perception frequency, according to an embodiment.

FIG. 3C shows an example sub-carrier map 330 of a frequency spectrum showing individual carriers 332 of a multicarrier signal (Orthogonal Frequency Division Multiplexing). FIG. 3C shows a center frequency 331 of the orthogonal frequency division multiplexing signal and further shows an example index number 333 of an individual sub-carrier which is assigned to a pixel as shown in 312 of FIG. 3A. The frequency separation 334 between adjacent subcarriers in one embodiment has been selected to be greater than twice the maximum frequency (for example 323 or 324) perceived by the targeted skin touch receptors.

For an embodiment, a set of signal waveforms for each sub-carrier for each target pixel are generated by retrieving instructions, wherein the retrieved instructions inform which tactile pattern is to be sent to each of the target pixels. Further, a specific waveform (frequency, phase, amplitude etc.) shape is collected from a database based on the tactile pattern being sent to each of the target pixels.

Figure 3D:
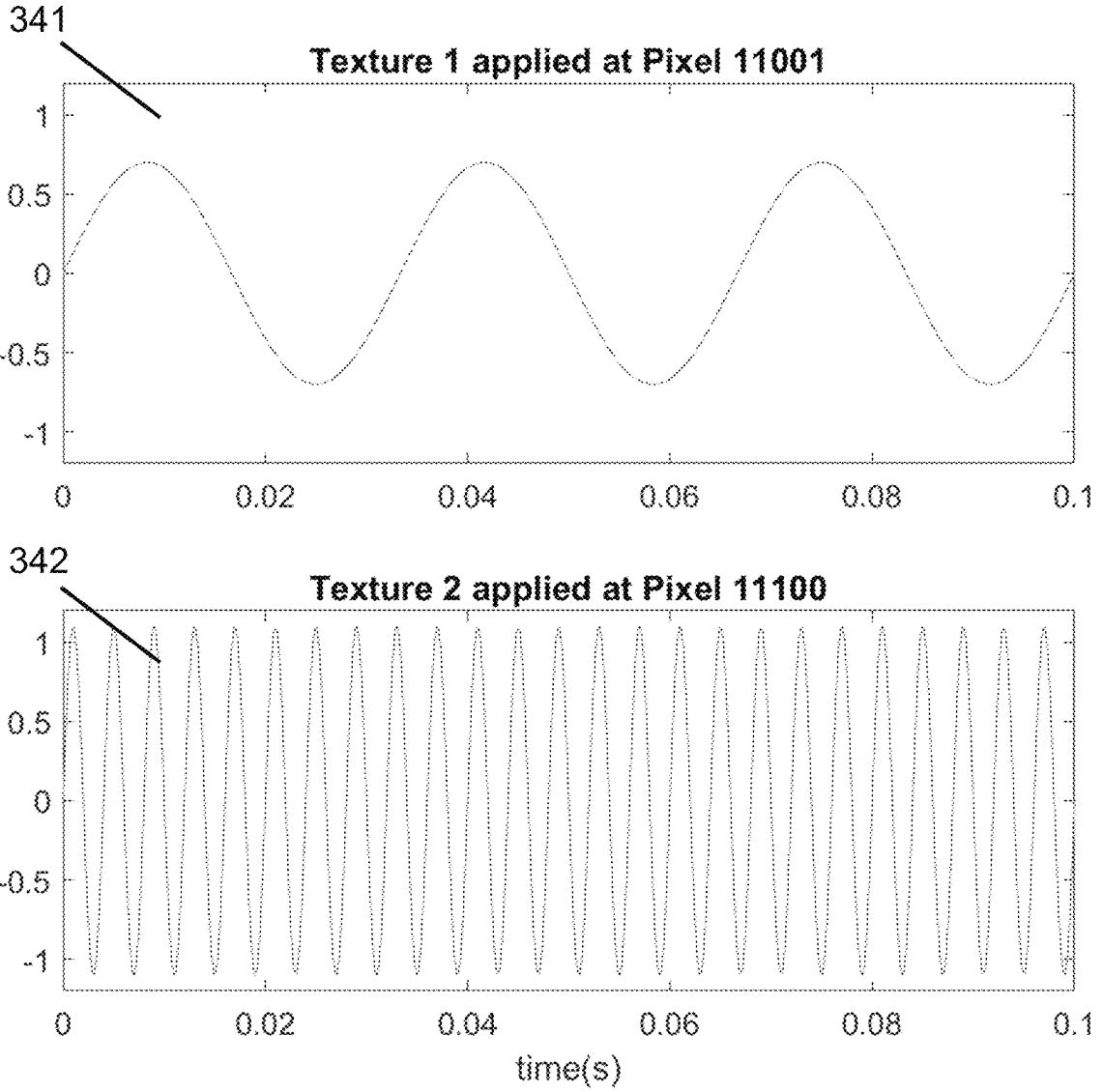
FIG. 3D shows an example of continuous waves assigned to two pixels to represent two different textures, according to an embodiment.

FIG. 3D shows an example of two signal waveforms assigned to two pixels to represent two different textures, according to an embodiment. FIG. 3D shows an example

341 of one texture pattern of amplitude and frequency to be transmitted to, for example, pixel index number 11001 of the plurality of potential target pixels 116. FIG. 3D further shows an example 342 of a second texture pattern of amplitude and frequency to be transmitted to, for example, pixel index number 11100 of the plurality of potential target pixels 116.

For an embodiment, addressing and beamforming to individual haptic pixels using continuous waves of frequency division multiplexing includes the use of orthogonal frequency division multiplexing (OFDM) in concert with Multiple Input Multiple Output (MIMO) beamforming techniques (such as the use of beamforming precoders with separate precoders for each subcarrier). For an embodiment, the beamforming spatial focusing performance is proportional to the number of transmit actuators and the spatial diversity and frequency selectivity of the channel. The design and use of channel decorrelators enhances the frequency selectivity of the channel. With the number of actuators, a higher quantity improves performance but comes at higher cost and complexity. At a minimum, the number of actuators must be greater than the combined number of peaks and nulls being targeted by the beamforming system for each frequency subcarrier, with the greater the ratio resulting in more stable beamforming performance. The channel response between a given actuator and two neighboring pixels at two different frequencies are less independent the closer the frequencies are to each other. To case beamformer performance a frequency map such as the example shown in FIG. 3A can be used to increase the spatial separation between pixels operating at nearby frequency subcarriers. In some embodiments, the beamformer can focus to only a target pixel or in other embodiments it can additionally transmit a null to the nearest pixel which has the closest subcarrier, to minimize (reduce) leakage of the signal to that pixel. The use of nulls comes at the cost of energy sent to the target pixel so maximizing spatial diversity through the use of channel decorrelators is preferable.

For an embodiment, a beamforming precoder matrix is calculated for each frequency sub-carrier using channel responses from the channel response matrix which focus energy to or away from each of the targeted pixels 118.

An embodiment includes multiplying the beamforming precoder matrix with corresponding signal waveforms to generate transmit waveforms to be transmitted from each of the plurality of actuators for each sub-carrier. The generated transmit waveforms operate on the haptic surface 111 to deliver the tactile pattern at each of the target pixels.

For an embodiment, the frequency sub-carriers are determined using orthogonal frequency division multiplexing, and the beamforming precoder matrix is determined by computing a multiple input multiple output zero forcing pseudo inversion of the specific channel responses of the targeted pixels 118 taken from the channel response matrix.

For an embodiment the haptic surface 111 may comprise a propagation layer designed to carry mechanical waves from the plurality of actuators to the plurality of potential target pixels. The design of the propagation layer will depend on the mode of propagation for the waves designed to propagate within it and a few example propagation layers are described below. The haptic surface 111 may in some embodiments include additional layers adjacent to the propagation layer. A touch layer may sit atop and adjacent to the propagation layer in between the finger and the propagation layer. A bottom layer may sit adjacent to the propagation layer in between the propagation layer and any other electronic components with which the haptic system is to be integrated. The additional layers may serve a number of purposes, such as confining energy to within the propagation layer, isolating the channel response matrix of the propagation layer from the impact and pressure of body parts or other objects making contact with the surface, altering the temporal or frequency content of the focused waves to bring them to within the temporal and frequency range which can be perceived by the skin touch receptors (mechanoreceptors) being targeted.

For an embodiment, the haptic surface includes a propagation layer configured to support propagation of an ultrasonic mechanical wave, wherein a wavelength of the ultrasonic mechanical wave is less than twice a spacing between targeted types of skin touch receptors, and an attenuation of the propagation layer is selected in conjunction with the plurality of channel decorrelator elements to sufficiently decorrelate the channel responses between each of the plurality of pixels and each of the plurality of actuators.

In some embodiments, the mode of propagation used in the propagation layer are bulk P waves. In some embodiments the propagation layer is made of an elastomer such as silicone. In some embodiments the propagation layer may comprise a phononic crystal or a metamaterial, taking the form of an architecture with geometric or material modulation, including but not limited to lattice structures, minimal surfaces, and locally resonant systems which can be used to leverage directional wave beaming to guide waves along certain paths, as well as prevent wave propagation outside certain regions. In some examples a plurality of ultrasonic transducers surround the active area comprising potential target pixels 116. In other examples the actuators are placed on the underside adjacent to the propagation layer below potential target pixels 116.

Figure 4A:
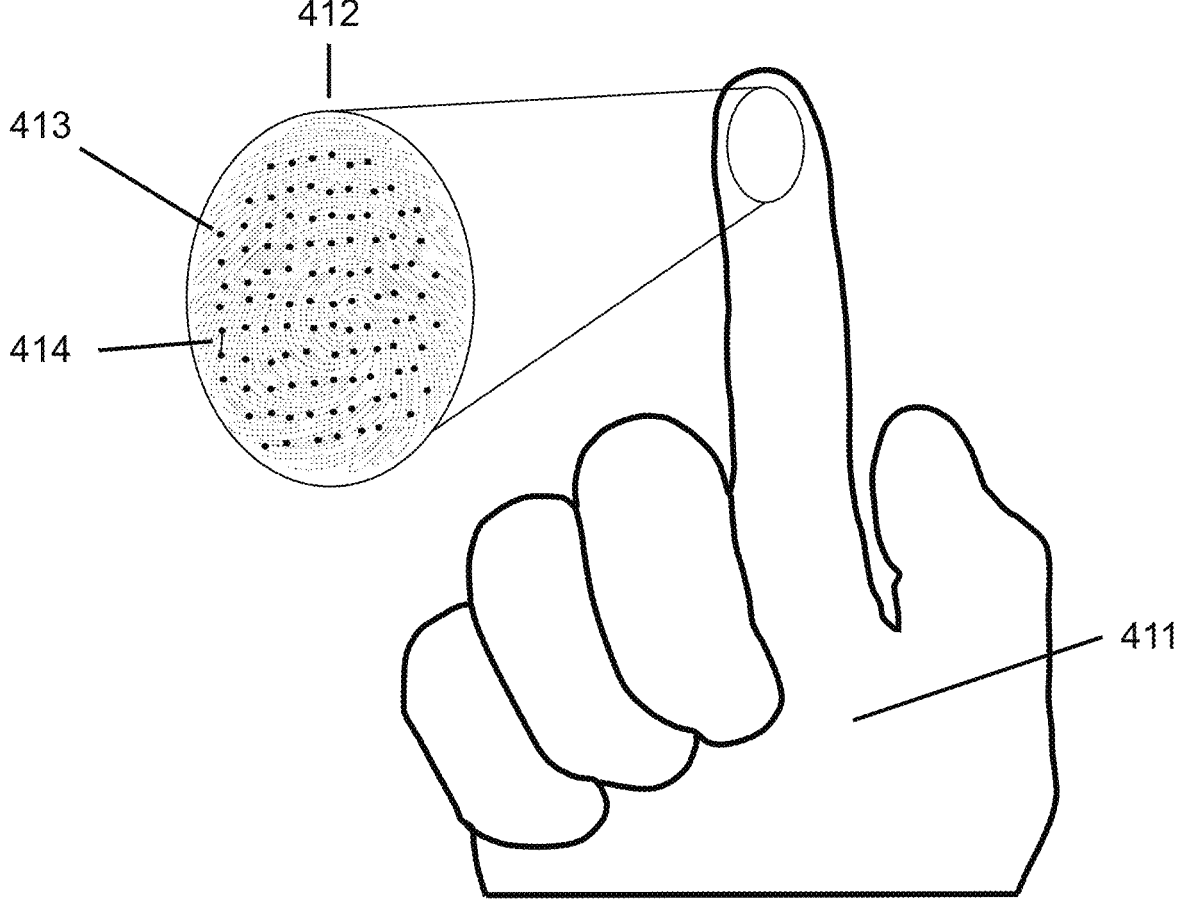
FIG. 4A shows an example distribution of skin touch receptors to be used in determining a wavelength of the propagation layer, wherein the wavelength is chosen to be less than twice the separation between receptors, according to an embodiment.

FIG. 4A shows an example distribution of skin touch receptors 413 of a hand 411 to be used in determining a wavelength of the propagation layer, wherein the wavelength is chosen to be less than twice the separation between receptors, according to an embodiment. As shown, a zoomed in region 412 of skin of a human finger depicts the touch receptors 413 of the skin, and a typical distance 414 between the touch receptors 413.

FIG. 4B shows an example of a propagation layer 420 wherein a wavelength in the material 421 of the propagation layer is less than twice a target pixel spacing, with a periphery 423 and channel decorrelator elements 427, 428 that have a shape to increase channel decorrelation, according to an embodiment. For an embodiment, the plurality of channel decorrelator elements include scattering elements 427 configured to introduce scattering of the mechanical waves in the haptic surface, where the scattering elements include structures (or voids) comprising materials selected for a difference in acoustic impedance computed from the material properties of the channel decorrelator elements and the propagation layer. For an embodiment, the plurality of channel decorrelator elements comprise dispersive elements 428 configured to introduce time spreading of individual frequency components of the mechanical waves in the haptic surface, wherein the dispersive elements include materials or structures which introduce frequency dependent wave speeds. The mechanical waves propagating in the propagation layer have a designed mode of propagation. The mode of propagation may include flexural, lamb, pressure and/or shear waves.

It is to be understood that the described embodiments rely on the channel decorrelator elements to sufficiently decorrelate the channel of adjacent pixels and that the channel response matrix can be sufficiently calibrated a-priori and remain predictably stable through the operation of the haptic display system. Such a system is therefore incompatible with surface waves as surface waves travel on the outer surface of a substrate and its channel response is altered by the contact of a human appendage (such as a finger) on the device making the calibrated channel matrix no longer valid. Accordingly, the described embodiments are not directed to focusing mechanical waves that rely solely on surface modes propagating over the haptic surface.

For an embodiment, a material 421 of the propagation layer 420 is configured to support propagation of ultrasonic waves. For an embodiment, the periphery 423 surrounding the propagation layer includes a second material (different from the material of the propagation layer) that is selected for a difference in acoustic impedance from the material of the propagation layer 421. The purpose for this impedance mismatch is to confine the waves to within the propagation layer. The periphery 423 also includes a shape selected to increase (maximize) decorrelation between the channels responses of adjacent pixels. Actuators 422 generate the mechanical waves in the propagation layer 421.

FIG. 4B further shows a potential target pixel 424, and a separation 425 between pixels which for an embodiment, is selected to be less than a separation 414 between touch receptors of the human skin. For an embodiment, the wavelength 426 of the mechanical waves propagating in the propagation layer is less than twice the separation 425 between the target pixels 424.

In some embodiments, the beamforming performance (which is described here as related to the number of haptic pixels meeting a desired spatial signal to noise ratio from a given number of transducers) is proportional to the decorrelation of the channel matrix. Depending on the specific type of beamforming used, the channel can be optimized to improve the beamforming performance. In the case of the transient time reversal case previously discussed, to get the most pulse compression, it is desirable to have the maximum number of scattered and bounce paths between each actuator and target location. In some embodiments, this can be achieved by introducing an array of scattering points between each source and target. In some embodiments, this can be achieved by careful selection of the shape of the periphery. Both approaches will spread the arrival time of signals over a longer period of time which can be compressed to a transient using time reversal. The attenuation and wave speed of the channel can also be optimized to control the frame rate. The faster the signals adequately decay, the higher the time division multiplexing factor. This however comes at the cost of less energy compressed within the time slot.

For an embodiment, ultrasonic transducers are bonded to the haptic surface around the periphery of the active area with a gap between the transducers and the edge of the plate. The edges of the haptic surface can be contoured with curvatures such as discrete arcs or lines with varied angles to maximize the diversity of reflected paths. Additionally, holes may be placed in the haptic surface in the area in front and around the actuator to maximize the scattering paths between the actuator and the target locations.

Another variable to decorrelate the channel matrix includes harnessing the channel dispersion. In a dispersive channel different frequency components travel at different speeds spreading energy in time and decorrelating the channels between frequencies. Depending on the mode of propagation, the channel may be highly dispersive or not. In a case such as P waves through a bulk elastomer which is non-dispersive, the dispersion can be dramatically increased with a spatially variable dispersion component by changing the formulation of the bulk substrate heterogeneously. One way to do this would be to add for example silicone oil in a mixture of silicone elastomer with an intentionally uneven distribution of concentrations. Depending on the ratio of oil to elastomer, the P wave velocity will vary, increasing the amount of variation between each frequency and a given target location.

For an embodiment, a location and a shape of one or more of the plurality channel decorrelator elements or a periphery are selected to reduce cross correlation between neighboring pixels, enhance energy received at the plurality of pixels and control a spread of a channel impulse response at each pixel of the plurality of pixels. In some embodiments the method by which this selection is made includes iteratively varying one of the parameters and computing the performance along each of the metrics and using that information to guide the selection of the next parameter to be altered. In some embodiments the iterations may be implemented to optimization by reinforcement learning or adjoint method.

To optimize the geometry of the propagation medium and the location and size of scattering and dispersion channel decorrelator elements, one can use an optimization technique such as reinforcement learning or the adjoint method where the reward function or objective function is set proportional to the decorrelation between adjacent pixels and in the transient beamforming case, that the energy is spread out through dispersion and multipath over time (i.e. the peak to average power ratio of the transmit waveform is reduced).

For an embodiment, the haptic surface includes a propagation layer configured to support ultrasonic flexural modes of vibration, wherein a thickness of the propagation layer is selected to be smaller than a shortest wavelength of the mechanical waves propagating in the propagation layer, wherein a longest wavelength of the mechanical waves is less than twice a spacing between targeted types of skin touch receptors as shown in FIG. 4A, and wherein a material of the propagation layer is selected based on a ratio of a density of the propagation layer to an elastic modulus, and based on a resistance of the propagation layer to plastic deformation, and based on a propagation attenuation of the propagation layer at frequencies of the mechanical waves.

For an embodiment, a structural plate is used as a propagation layer for elastic waves. The pixel pitch sets the maximum considered wavelengths (for example 1-3 mm). The properties of the plate can be determined by setting a target frequency range of 100-400 kHz for the transducers. While ultrasonic frequencies above this and below this are indeed possible, at these frequencies it is easier to balance the need for actuators with reasonable displacement amplitudes, substrate thicknesses and the target wavelength.

For an embodiment, a propagation layer comprising a thin structural plate which is much thinner than it is wide (4-5 orders or magnitude) and where the considered wavelengths are multiples of the plate thickness, and therefore, shear deformations and rotary inertia can be neglected, allowing sufficient modeling of the dynamics of the plate via Kirchhoff theory (although Mindlin theory will yield similar results).

Given a chosen material with uniform material properties and cross section, a required plate thickness can be calculated for a target range of frequencies. For the Kirchhoff formulation, which models bending waves, a plate thickness to be 50-200 micrometers can be imposed. In a design which does exceed this thickness, Mindlin or Lamb theory can be leveraged which is readily implementable without loss of generality of the beamforming mechanism and discussion herein. In these cases, thicknesses up to 500-900 microns can be considered. Returning to the Kirchhoff case, the ratio of density to elastic modulus ($\rho$/E) can be found which determines the thickness required to support a given range of frequencies targeting a specific wavelength range. It can be observed that in all cases, $\rho/E<1e-6$ results in relatively small thicknesses for the considered frequency range. If the frequency range is increased, the thickness can be increased, as well as the span of wavelengths contained in our signal's operating range. An isotropic material which meets this criterion for this target frequency range is polyethylene ($\rho/E\approx6e-6$). Other materials which may be used with beneficial properties (low loss wave propagation, resistance to plastic deformation etc.) are lower modulus glasses such as chalcogenide glass or flexible glass or amorphous metals.

FIG. 5 shows a structural plate which may be used to implement the propagation layer 500, according to an embodiment. For this embodiment, the propagation layer 500 of the haptic surface comprises a material which supports flexural modes selected for the ratio of its density to elastic modulus and for its resistance to plastic deformation and its propagation attenuation at a wavelength 506. For an embodiment, a thickness 501 of the propagation layer is significantly thinner than the wavelength 506 of the waves propagating through the propagation layer 500. As described, actuator(s) 502 generates the mechanical waves that propagate through the propagation layer 500.

For an embodiment, a boundary shape 503 of the propagation layer 500 is configured to increase (maximize) decorrelation between the channels of the adjacent pixels 504. As previously described, for an embodiment, a separation 505 between target pixels 504 is selected to be less than a separation between touch receptors of the human skin 414. FIG. 5 further includes the previously described scattering based channel decorrelator elements 507.

Some embodiments include a touch layer adjacent to a propagation layer of the haptic surface designed to be contacted by human skin. One purpose for a touch layer adjacent to the propagation layer is to alter a transient impulse shape. The shape of the impulse will impact the amount and type of human perception. In some cases this impulse shape can be altered through the frequency content of the source signals or the channel design. However, in many cases it would be best to optimize this separately without affecting the design of the propagation layer or the frequencies used in the propagation layer. In this case, tuning the material properties of the touch layer can slow a very fast impulse, so that it matches the duration to which the human touch receptors are most sensitive. Further, in some embodiments it may be preferable to have multiple different pulse widths and envelopes varying from 100s of microseconds to 100s of milliseconds in duration, to provide varied stimuli to the skin. In this case, in some embodiments the touch layer can slow the transient from the propagation layer to be only as slow as the fastest impulse to be generated at the finger contact surface of the touch layer, and slower pulses can be constructed by sending a series of transients in a train, varying their amplitudes such that the envelope of a very slow pulse is generated on the finger contact surface of the touch layer.

In some embodiments the physical mechanism by which the transient is slowed is the acoustic radiation force mechanism where a change in material properties of the touch layer relative to the propagation layer (for example wave velocity, impedance and absorption) results in a net momentum transfer of the impinging ultrasonic wave.

Figure 6A:
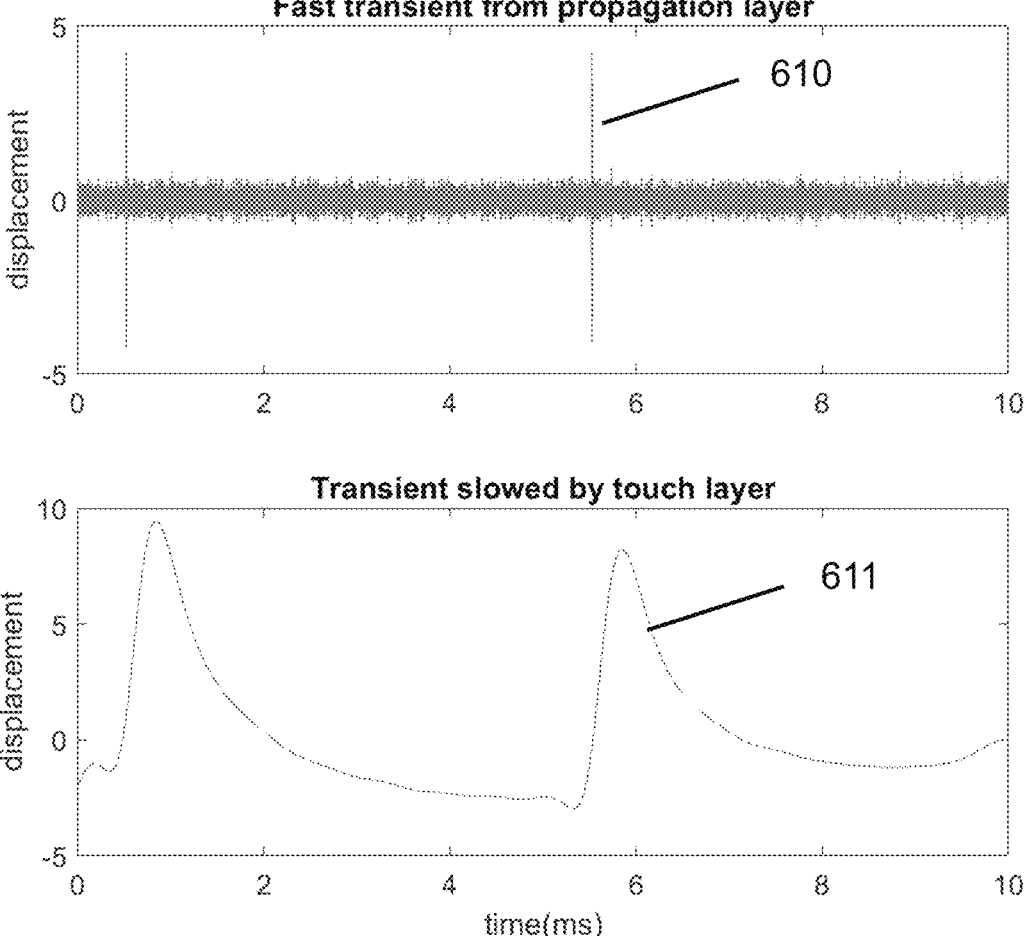
FIG. 6A shows the before and after waveforms from a touch layer adjacent to a propagation layer which slows pulses, according to an embodiment.

FIG. 6A shows the before and after waveforms of a touch layer adjacent to a propagation layer designed to slow a pulse, according to an embodiment. FIG. 6A shows an example 610 of a fast transient pulse arriving from the propagation layer at one side of the touch layer. FIG. 6A shows an example of the transient pulse 611 at the finger side of the touch layer having been slowed by the touch layer.

For an embodiment, to ensure that this temporal broadening does not come with spatial broadening, the touch layer can be designed to be anisotropic, preventing energy from spreading laterally to neighboring pixels.

Figure 6B:
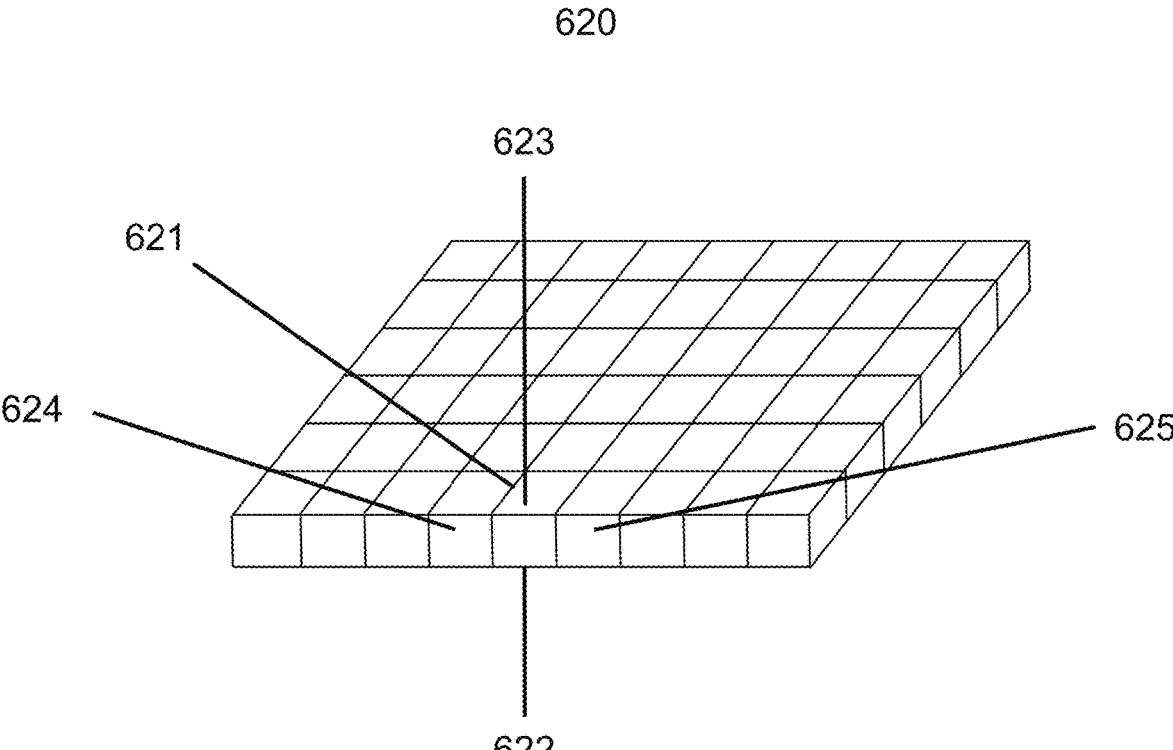
FIG. 6B shows an example of an anisotropic touch layer adjacent to the propagation layer which inhibits lateral spreading of energy as the pulse is slowed, according to an embodiment.

FIG. 6B shows an example of an anisotropic substrate used as a touch layer which inhibits lateral spreading of energy as the pulse is slowed, according to an embodiment. FIG. 6B shows an example of an anisotropic layer 620 located between the propagation layer and the surface that a finger makes contact with. FIG. 6B shows an exemplary cell 621 of the anisotropic layer 620. FIG. 6B further shows a side 622 of an example cell which receives a transient 610 from the propagation layer. FIG. 6B further shows a side 623 of an example cell which passes on slowed transient 611 to, for example, a human finger, without spreading energy to adjacent cells 624, 625.

FIG. 7 shows an example of a touch layer 702 added to a propagation layer 701 of a haptic surface 700 to enhance acoustic radiation force momentum transfer, according to an embodiment. At least some embodiments include a touch layer adjacent to a propagation layer of the haptic surface configured for contact by human skin, and configured to enhance momentum transfer of an acoustic radiation force while isolating pressure of a finger contact from the propagation layer as shown in FIG. 7.

The touch layer 702 and adjacent propagation layer 701 can be selected to have identical impedances to reduce the reflection at the boundary, while maximizing the wave velocity difference to maximize the acoustic radiation force. If the touch layer has a faster wave speed than the propagation layer, the net momentum transfer will be towards the finger.

One purpose for the touch layer is stabilizing the channel matrix. The channel matrix is measured or estimated during manufacturing and stored in the device. In-situ partial calibration is possible and is discussed later. However, it is ideal for the channel to be stable regardless of the interaction of fingers or other objects on the surface. One way to do that is to design the touch layer such that any change in impedance from objects of body parts making contact with the outer side does not alter the path of waves within the propagation layer. In one embodiment this is achieved through control of geometry or adjusting the material impedance, wave speed, loss properties etc. In another embodiment the touch layer includes a phononic crystal or a metamaterial, taking the form of an architecture with geometric or material modulation with a bandgap frequency selected according to the frequencies used in the propagation layer, sitting atop or integral with an acoustic radiation force maximizing layer. In this embodiment the ultrasonic waves in the propagation layer are guided within the propagation layer by the phononic crystal or metamaterial and are unaffected by the presence of body parts such as fingers placed on the touch layer while the acoustic radiation force maximizing layer generates a net momentum transfer which can traverse the phononic crystal or metamaterial to the body part in contact with the top surface.

For an embodiment, a buffer material can be added in the touch layer which acts as a force absorber for the contact of a finger, without significantly reducing the transmitted stimuli from the propagation layer to the finger. This layer can take a thickness anywhere 0.25-4 times that of the propagation layer.

Another embodiment of the touch layer includes the use of contrasting material layers in a composite through the creation of pillars comprising materials of different mechanical properties. These pillars must be less stiff than the surrounding matrix. In response to dynamic loading, larger surface deformations may occur at these discrete pillar locations than the surrounding matrix. The pillars may also act as waveguides at the appropriate frequencies. A deformed surface for tactile sensation can thus be approximated using these pillars as pixels.

For an embodiment, the touch layer adjacent to the propagation layer of the haptic surface includes an array of resonators, wherein each resonator has a different resonant frequency from its neighbor, wherein specific sub-carriers of the frequency division multiplexing scheme resonate only specific resonators.

For an embodiment, the local resonators of a touch layer are structural elements coupled to an elastic foundation or structural matrix which have distinct resonance frequencies, typically on distinct orders from the operating frequency range of the surrounding material. As such, a separation of frequency scales can be obtained. A characteristic feature of these materials is the bandgap they produce at their local resonance frequency. This bandgap can be leveraged with local irregularity to induce a local vibration in this architected structure. By creating varying defects within a pixel, different resonances at different locations can be targeted.

In a periodically modulated structure such as a phononic crystal, vibrations may be localized by locally breaking translational symmetry of the underlying lattice. This defect may take any size. The localized vibrations resulting from these defects decay exponentially in space away from the defect, and their eigenfrequencies exist in stop band frequencies. As such, vibrations may be localized at these frequencies. Localized vibrations can be diversified in a haptic display by introducing defects of different magnitudes at different pixels. This allows targeting different pixels by transmitting different frequencies. Perceptual haptic vibrations can be achieved by modulating the incoming wave, exciting the localized defect mode periodically.

For embodiments where continuous wave beamforming is to be used (such and with frequency division multiplexing), a carrier frequency or subcarrier can be focused to a specific haptic pixel. As the carrier frequency used in the propagation layer is ultrasonic and the perception frequency range of human skin is below 1 kHz, one of a number of methods of downconversion to render a perceivable sensation is required.

The first downconversion method includes a self-demodulation process. This occurs because of the nonlinearity of the medium. The downconverted baseband vibration will be proportional to the second derivative of the square of the modulation signal. To render a desired sensation waveform a modulation signal equal to the square root of the double integral of the desired signal is transmitted. The selection of the touch layer and/or propagation layer of the haptic surface can be done to maximize the nonlinear coefficients to enhance (maximize) the downconversion.

A second downconversion method includes a mixing technique. A modulated carrier signal and separately transmitted LO (local oscillator) signal are transmitted. At the point where both waves meet, both a sum and difference signal will be generated. The sum signal would be twice the carrier frequency and so suffer from higher attenuation and not be perceivable. The difference signal carries the baseband vibration signal. As in the case of the previous method, the downconversion is proportional to the nonlinear parameter so the material can be chosen to optimize for this. Alternatively, a metamaterial can be designed to preferentially downconvert the signal (difference) and suppress the upconversion (addition). An example of this is through a combination of coiling up space to maximize the downconversion and using a bragg gap to minimize the upconversion.

A third method for downconversion includes increasing the momentum transfer of acoustic radiation force mechanisms. The envelope of a modulated carrier can in part be extracted by coupling the choice of modulation waveforms with a touch layer with an appropriately selected material selected based on its acoustic radiation force when placed adjacent to the propagation layer.

The presence of cavitation bubbles in a homogeneous acoustic medium presents an opportunity to excite local resonances. If the wavelength of an incoming wave is on the order of the bubble size, it may excite the bubble. Once excited, large deformations produce secondary vibrations. One such vibration is a dipole excitation whereby the bubble radius oscillates about its equilibrium position in a matrix. This produces detectable signals at the resonance frequency. A downconverted frequency which may be orders of magnitude below the driving frequency may be detected if the bubble inclusions are arranged in an array. Another possible vibration is the monopole excitation whereby large amplitude radial vibrations of the bubble at resonance create harmonics. These harmonics may interfere with the incoming wave to produce a difference frequency. To enable manufacturing of materials with integrated bubbles, polymer microspheres can be added during the manufacture of the substrate.

One method to enhance downconversion is to design the haptic surface such that the amount of downconversion is proportional to the amount of pressure being applied. This could be achieved with a material with a nonlinearity parameter which increases underload.

One benefit of approaches which include an array of downconversion structures (inclusions, alternate impedances, alternate materials, resonant structures) is that the location of maximal downconversion can be preset by the manufacturing process. A predetermined grid pattern of downconversion structures would allow the passband beamforming spatial focus performance to be lower than the spatial focus of the rendered vibrations which are perceived by the user. This has the effect of allowing longer wavelengths than the spatial acuity of the skin within the propagation layer, casing the requirements of the system.

Figure 8A:
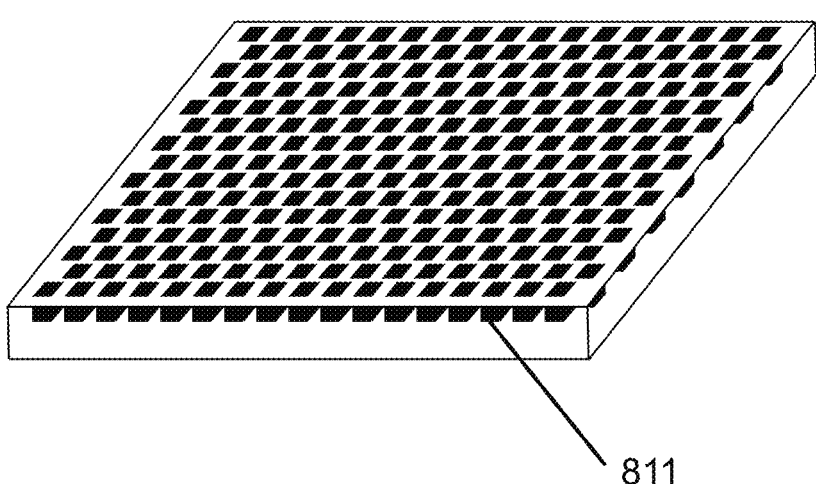
FIG. 8A shows a layer added to the propagation layer with a grid of nonlinear elements for enhancing frequency downconversion, according to an embodiment.
Figure 8B:
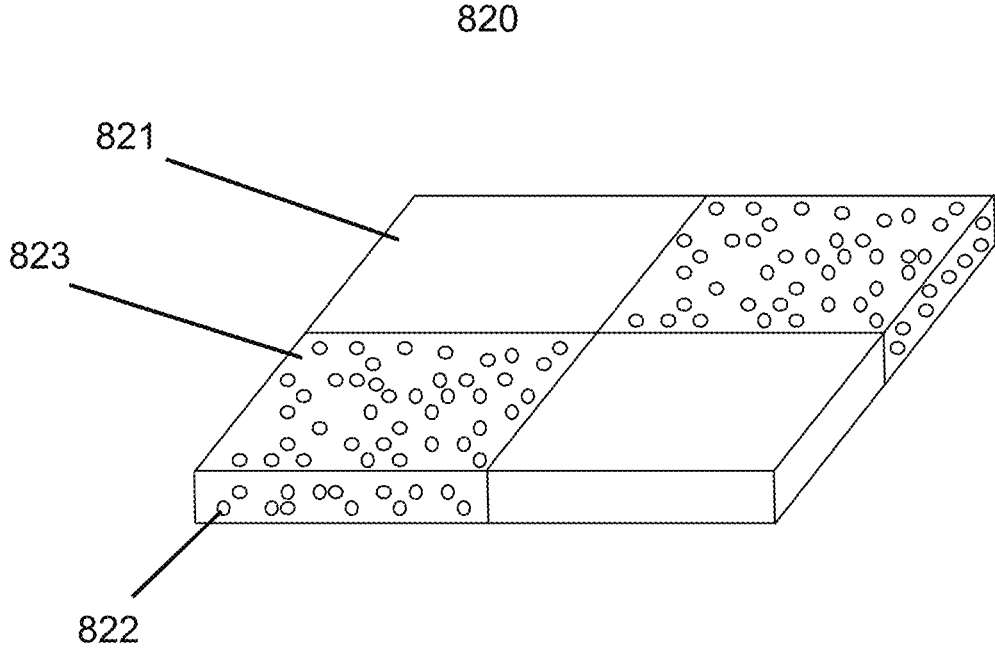
FIG. 8B shows a zoom in of the grid of FIG. 8A wherein the geometric nonlinear elements include microspheres, according to an embodiment.

FIG. 8A shows an example touch layer 810 with a grid of nonlinear elements 811 for enhancing the localization of the frequency down-conversion mechanism to improve the spatial focusing achieved, according to an embodiment. FIG. 8B shows an example zoomed section 820 of the grid of FIG. 8A wherein the geometric nonlinear elements used within each highly nonlinear region 823 include microspheres 822, according to an embodiment.

An embodiment includes a bottom layer adjacent to a propagation layer of the haptic surface configured to confine propagating waves to within the propagation layer such that the channel response matrix is not affected by the presence of a visual graphics display, touch sensor or other hardware component. In some embodiments the bottom layer comprises an elastic foundation (modeled as a winkler foundation) or a phononic bandgap or metamaterial designed to block the specific frequencies of mechanical waves propagating in the propagation layer through a periodic modulation of material or structural properties.

Using a triply layered medium to guide waves locally in the propagation layer can be considered. Further, a layered composite in which the mechanical impedance of the propagation layer differs significantly from that of its surrounding materials can be considered. This will allow for internal reflections which enforce waveguiding in the 2D plate rather than radial 3D propagation, preventing energy loss. This arrangement may be paired with other waveguides in the touch layer normal (perpendicular) to the propagation layer to carry energy towards the finger or other body part.

In order to support the plate from bending under its own weight, or plastically deforming under the pressure of a finger, the addition of an elastic foundation as a bottom adjacent layer under the propagation layer can be included. This foundation may take the form of a compliant material which couples both stiffness and damping to the propagation layer. This may be modeled via a Winkler foundation. Materials such as silicone, thermoset polymers, glass, or a soft gel can be utilized.

An alternative elastic foundation for the bottom adjacent layer comprises phononic crystals. Phononic crystals are architected structures capable of producing frequency bandgaps, or stop bands. These structures require periodic modulations in their properties (including but not limited to: periodically varying density, Young's modulus, poisson's ratio, area, second moment of area, locally resonant substructures, fractal generations, effective structural stiffness, or effective structural mass). Bandgaps are accomplished by coherent scattering of waves on the order of the lattice parameter, which lifts a degeneracy at the bounds of the Brillouin zone (limits of unique solutions) in reciprocal space, creating a region between two dispersion branches which do not have a solution i.e. a bandgap. This gap is considered a Bragg gap for its connection to the Bragg condition of coherent scattering in x-ray diffraction. By using these materials as an elastic foundation of the plate, reflection at the operating frequency range is promoted through a negative effective refractive index which can help prevent loss while maintaining the benefits of the elastic foundation. Specifically, if the lattice parameter is on the order of the considered wavelengths, transmission of energy out of the plate into the coupled foundation may be prevented, hence preserving power transmission within the propagation layer.

The bandwidth of attenuated frequencies in a phononic crystal elastic foundation bottom adjacent layer can be increased by doing one or more of three things. One method is to functionally grade the lattice parameter of a phononic crystal. This widens the bandgap around the initial gap frequency. A second option is to functionally grade local resonance frequencies, which will create a rainbow trapping effect that separates wavelengths in space and generates a broader resonance gap. A third option is to design a material with phononic crystal and metamaterial characteristics. The Bragg gap with the local resonance gap by near-coincidence of the lattice parameter and local resonance wavelengths can be combined.

Figure 9A:
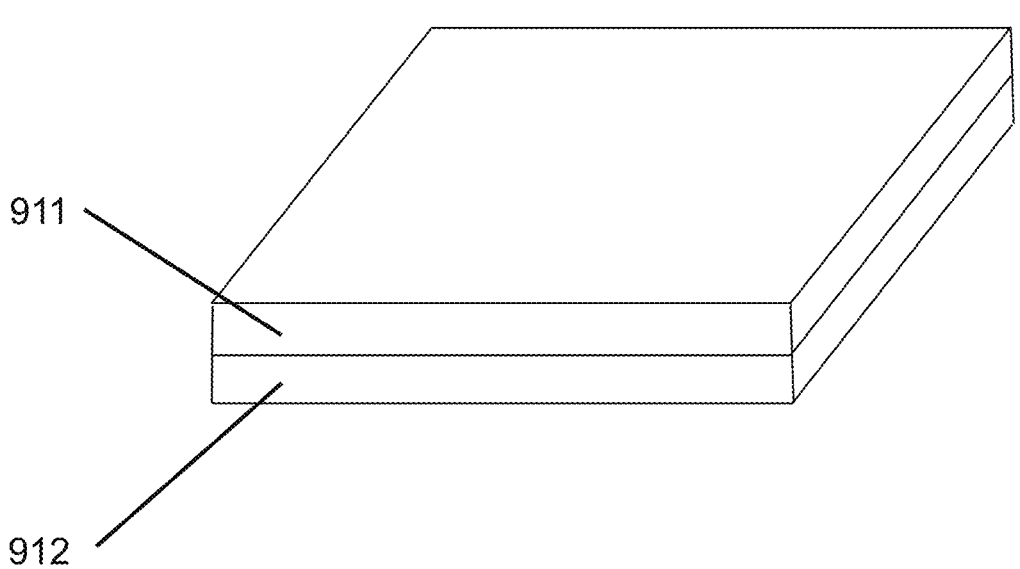
FIG. 9A shows a bottom layer which sits between a propagation layer and a visual graphics display or other component, wherein the bottom layer includes an elastic foundation, according to an embodiment.

FIG. 9A shows a bottom layer which sits adjacent to a propagation layer and between it and a visual graphics display or other component, wherein the bottom layer includes an elastic foundation, according to an embodiment. FIG. 9A shows an example section 910 of the haptic surface. FIG. 9A shows the propagation layer 911 of the section 910 of the haptic surface. FIG. 9A additionally shows an elastic foundation 912 that includes materials selected to prevent a wave traveling in the propagation layer from coupling into the elastic foundation 912.

FIG. 9B shows a zoomed-in section 920 of an example elastic lattice supporting mechanical wave propagation. The lattice uses variations in mechanical impedance, in this case by periodic variations in mass distribution at predetermined lattice sites, to generate band gaps in the frequency domain. The site couplings are illustrated by solid and dashed lines. FIG. 9B labels the solid line couplings 921, which are the next nearest neighbor couplings of length 922, which is the lattice parameter. The dashed lines 925 depict the diagonal nearest neighbor couplings within each unit cell, their length is a function of lattice parameter 922, although in this case, a body-centered-cubic lattice is depicted, and therefore its length is $\sqrt{3}/2$ of lattice parameter 922. This length may vary depending on the ultimate lattice geometry, which can take various configurations to achieve a frequency bandgap. FIG. 9B shows 923 and 924 as nodes of the structure with two different masses, mass 1 and mass 2 respectively.

Figure 9C:
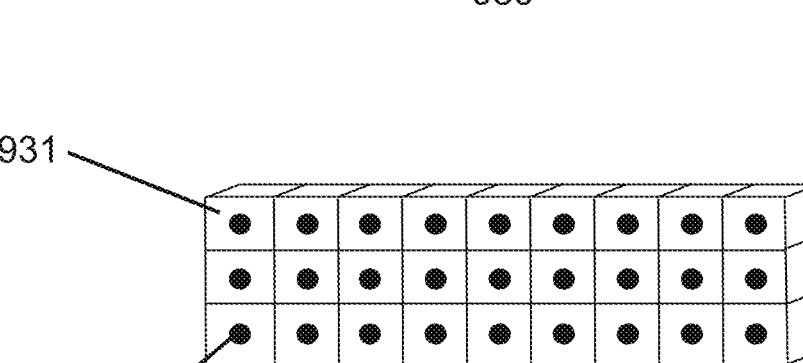
FIG. 9C shows a zoomed-in section of an example phononic crystal capable of producing a phononic bandgap using a periodic variation in material properties, here shown by spherical inclusions in a matrix where the sphere material properties vary from those of the matrix. The illustrated configuration simultaneously represents the general architecture of an elastic metamaterial whereby a bandgap is generated at the resonance frequency of the spherical inclusions, which represent local resonators capable of trapping waves.

FIG. 9C shows a zoomed-in section of an example architected structure capable of producing frequency bandgaps. FIG. 9C provides an example section 930 of this material which may act as a phononic crystal or metamaterial depending on the frequency bandgap mechanism: Bragg scattering or local resonance, of which both are possible in this general example. FIG. 9C illustrates two materials varying periodically, material 931 and material 932, which both have a different set of material properties. Although a difference in material properties can be specified, the geometric properties can also be varied to promote bandgap formation, for example, by considering material 932 to be empty space. FIG. 9C shows a unit cell 933 and lattice parameter 934 of a repeating pattern of the unit cell 933.

At least some of the described embodiments include actuators that include transducers which are piezoelectric, capacitive or magnetostrictive with operating frequencies between 20 kHz and 2 MHz. To be able to generate a 1 millimeter focus area for each pixel, diffraction limited physics limits our wavelength to less than 2 millimeters. Low frequencies below 10 kHz when combined with the wave speed of any practical mode of propagation would yield significantly larger wavelengths than this wavelength target. Frequencies below 20 kHz are also unfavorable as they generate audible frequencies. Wavelengths above 2 MHz are usable but typically suffer from higher attenuation and lower displacement amplitudes.

In many cases the actuators emit waves into the propagation layer with cylindrical or spherical wavefronts which result in 1/r or $1/r^2$ losses. One method to alter this is to include reflector structures such as parabolic reflectors with the actuator located at or near the focal point. The reflected wavefront becomes planar in the case where the actuator is located at the focal point or slightly convergent or divergent in the case of a slight offset from the focal point. The parabolic reflector structure can be further subdivided to include multiple focal lengths such that each reflected ray has a different path length to a given target further decorrelating the channel matrix.

For at least some embodiments the actuators are embedded in reflective structures which change spherical wavefronts to one or more planar or cylindrical wavefronts. For an embodiment, the actuators are placed on a reflective backing such as a metal grounding layer with the waves emanating from the actuator with spherical wavefronts. Alternatively, the actuators are set within parabolic reflectors with the actuators placed at or near the focal point of the parabolic shape so that the reflected waves are either planar or slightly diverging or slightly converging. For an embodiment, the parabolic surfaces additionally comprise many parabolic surfaces or varying focal lengths to maximize the variation in path lengths of each reflected wave.

In some embodiments the shape of the actuators may be selected to increase the vibration amplitude in a specific direction by setting the dimensions of each axis of the actuator proportional to the wavelength with wider dimensions relative to the wavelength resulting in higher amplitudes generated off the wider surface.

As described, the ultrasonic actuators may include piezoelectric, magnetostrictive or capacitive or other types and may include multiple layers or lever type structures to maximize their displacement at the use frequencies. As the number of transducer chains are the main cost and complexity driver, one may have a single amplifier connected to a number of orthogonal ultrasonic transducers in parallel.

For actuator types such as piezo transducers, the amount of mechanical displacement for a given amount of voltage is often related to the Q of the transducer (where Q is the ratio of the center frequency to the bandwidth). For this application both wide bandwidth and high amplitude are desirable. This goal can be achieved by taking a number of transducer elements which each have high mechanical displacement output but are narrow in frequency. As long as the frequency and bandwidth of each transducer element is selected to be orthogonal, the transducer elements can be connected in parallel to form a single 'actuator' of the plurality of actuators. Channel decorrelation can be further improved by physically placing each element far from the other transducer elements it is in parallel with.

FIG. 10 shows a zoomed-in section of the haptic surface with three narrowband high Q transducer elements in parallel and connected to a single transmit chain which represent an actuator of the plurality of actuators, according to an embodiment. FIG. 10 shows a section 1000 of a haptic system, a driver 1001 for an actuator, a wire 1002 connecting the driver 1001 to an array of transducers in parallel. FIG. 10 further shows a narrowband high Q transducer 1003 that generates mechanical waves at a first frequency that is orthogonal to the frequencies generated by other narrowband high Q transducers 1004, 1005. The narrowband high Q actuators are integrated within a haptic surface 1006.

An embodiment includes a single transmit chain (as shown in FIG. 10) connected to an array of narrowband transducers in parallel for each actuator of the plurality of actuators, wherein a frequency bandwidth and frequency separation between adjacent transducers is selected to allow for orthogonal operation, and wherein individual elements may be located spatially separate from one another to enhance frequency dependent channel decorrelation. For an embodiment, the parallel array of transducers counts as a single actuator of the plurality of actuators (for example, if there are 16 transmit chains ("actuators") and each of these transmit chains connects to 8 narrowband transducer elements such that there are 128 transducer elements total).

For an embodiment, one or more sensors are utilized to measure a location and extent 117 of one or more fingertip or other body parts in contact with the haptic surface to determine which of the plurality of pixels to target. In many applications, such as allowing a user to locate a virtual button on the screen with their fingertips without looking at the screen, the touch sensor system would need to delineate between the light glancing touch of fingers grazing on the surface, (~0.2N) in search for a specific button versus the action of deliberately pressing a virtual button (0.5-5N). For these applications deformation sensors may be included to measure the force/pressure being applied at each contact point on the surface.

At least some embodiments include deformation, force or pressure sensors for determining whether for example a user's finger is locating a button or pressing a button by comparing the pressure of contact for each of one or more body parts in contact with the haptic surface with calibration data, to aid in selection of appropriate tactile patterns to be transmitted at each target pixel within each contact area. In some embodiments, thin film deformation sensors such as nanoparticle quantum sensors or other force sensor technology can be integrated into the haptic surface.

In some embodiments the tactile pattern displayed is modulated proportional to the force of the body part such as the fingertip in contact with the haptic surface measured by the deformation sensor to impart to the user a more realistic sensation or an apparent motion (where the user perceives that their finger is moving through the haptic surface).

For an embodiment, individually addressing each of the plurality of targeted pixels 118 requires calibrating the haptic surface to generate a channel response matrix between each of the plurality of actuators and each of the plurality of pixels. It is to be understood that beamforming systems can be designed to operate open-loop or closed-loop. In traditional wireless systems, the channel is unpredictable and constantly varying and therefore each target terminal must constantly transmit pilot tones to sound the channel making a closed loop system. In the case of the haptic surface described here, with an appropriately selected propagating wave mode and well-designed haptic surface, the channel response between each pixel and each actuator can be made static allowing for open loop beamforming control. To ensure that the channel remains static, the touch layer and bottom layers adjacent to the propagation layer of the haptic surface can be configured to ensure that the presence of nearby objects does not affect the channel response.

In the case of a static channel, the channel response for every frequency subcarrier for every pixel from every actuator can be or collected once during manufacturing and pre-cached (for example, stored in a look up table channel response matrix) to be used for generating the beamforming signals. Alternatively, the haptic device can be modeled in CAD software and the channel can be predicted using finite element modeling software or using ray tracing software to predict the channel matrix.

Figure 11:
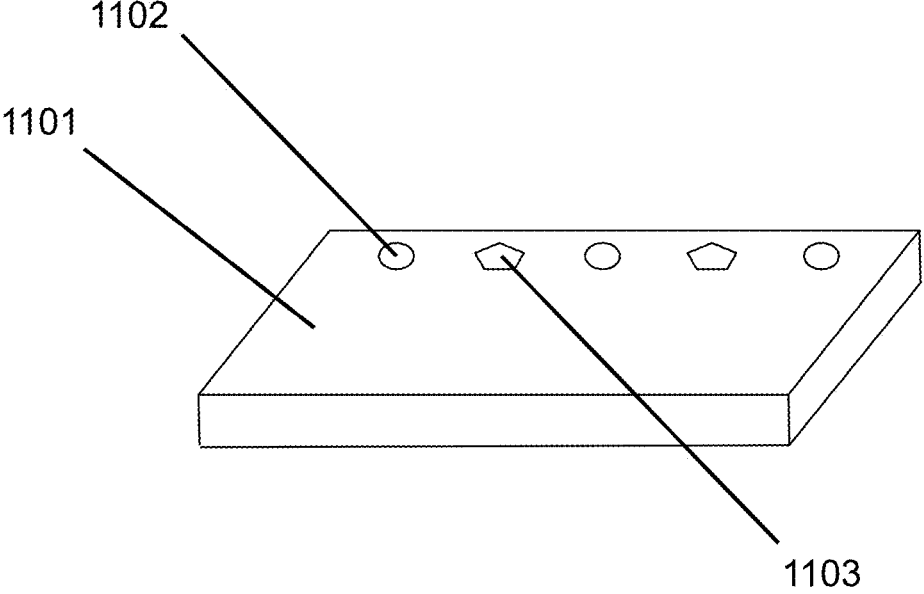
FIG. 11 shows an example of a zoomed-in section of a haptic surface with PVDF sensors used for calibration of the channel response matrix, embedded in the propagation layer between the plurality of actuators, according to an embodiment.

For at least some embodiments, the system is configured to include a channel response matrix, wherein the channel response matrix includes an impulse response over an operating frequency range of the propagation layer, between each of the plurality of actuators and each of the plurality of pixels. For an embodiment the channel response matrix is collected using one or more of the following, finite element or ray tracing simulation made during the design, laser doppler vibrometer or other measurements taken during manufacturing and in-situ measurements taken from ultrasonic sensors such as PVDF sensors embedded in the device during use as shown in FIG. 11. FIG. 11 shows an example of a zoomed-in section of a haptic surface with PVDF sensors used for calibration embedded in the propagation layer between the plurality of actuators, according to an embodiment. FIG. 11 shows a section 1101 of a haptic surface, an actuator 1102, and a sensor 1103 capable of measuring ultrasonic vibrations.

Generating the channel response matrix may involve the use of a scanning 1 or 3 axis laser vibrometer. For an embodiment, the vibrometer is moved from pixel location to pixel location on the surface and at each location, each actuator in turn transmits a known waveform (such as a chirp or OFDM waveform with known pilot signals with good autocorrelative properties). For an embodiment, the channel is extracted by dividing out the transmit frequency response from the measured vibration frequency response on each vector component (axis) of the vibration signal.

By collecting channel response data on 3 separate axes of vibration, each pixel can be vibrated along one or more of the three axes. Each axis can be treated by the beamforming system as a separate receiver. In this way more complex local vibrations may be generated. By combining neighboring pixels with two counterpropagating shear components local stretch or compression can be created. Alternatively in case of a metamaterial surface or surface with specific downconversion features, the beamformer may target specific vectors to trigger specific downconverted displacement directions (such as normal or shear).

Additionally, an in-situ calibration approach can be used. In one embodiment, PVDF or other similar piezoelectric sensors are embedded in the substrate (or alternatively transmit actuators not in use could be used as receivers) to record channel responses to be compared against known signals to predict changes to the stored channel data.

Alternatively, a closed loop beamforming approach can be used where one can include RF resonators in each pixel which backscatter an RF signal transmitted onto it while modulating the reflected carrier with the local vibration signal. This can be achieved through mems type structures or piezo structures which can encode the local vibration signal. To minimize RF losses and reduce the RF transmit power consumption, one of the layers of the haptic surface can be used as an electromagnetic waveguide.

One application for fine detail surface haptics is a tactile graphics display for the visually impaired. While a number of solutions exist to provide textual information to the visually impaired such as refreshable braille displays and text to speech devices, there is a need for a practical and affordable tactile graphics display capable of rendering images. Currently available devices use an array of thousands of mechanical pins which protrude on a surface. The pin spacing is larger than the spatial acuity of the skin resulting in a low-resolution display. Additionally, the large number of pins and associated electromechanical actuators result in a very expensive device. Using the systems and methods described herein, a tactile graphics display may be created with a large working area which can render the fine detail necessary to display for example, maps to help a vision impaired user navigate the world. Such a device could act as a peripheral which pairs to a computer or a smartphone and converts images displayed on a standard monitor to spatio-temporal patterns displayed on the haptic surface. Alternatively, a standalone device could be made which combines the computing and networking capabilities of existing smartphones or tablets with a tactile graphics display. For this application, the haptic surface can be thick and opaque, allowing for a different orientation and distribution of actuators from other applications which require transparency and actuators on the periphery.

A second category of applications is a touchscreen with integrated surface haptics. Touchscreens have become an integral part of our daily lives, integrated into the most commonly used devices ranging from smartphones to tablet computers, infotainment units in cars to information kiosks and machine controls. While the touchscreen display allows for the convenience of an easily reconfigurable input/output interface, this reconfigurability comes at the cost of a lack of tactile haptic feedback for the input interface. This is acceptable for certain applications where the user naturally is looking at the touchscreen while interacting with it. But for other scenarios, such as a touchscreen control on a car, requiring the user to take their eyes off the road to be able to locate where on a touchscreen to place their fingers to adjust the temperature poses a significant safety risk. For other scenarios, the need to stare at the screen to use it lowers productivity, an example of this is typing on a touchscreen. With standard keyboards it is possible for a user to type without looking at the keyboard. This is not possible with a virtual keyboard on a standard tablet PC. Such a touchscreen with integrated surface haptics can be used for everything from reconfigurable virtual musical instruments, gaming devices, to apps which allow a user to feel a fabric texture while shopping.

Figure 12:
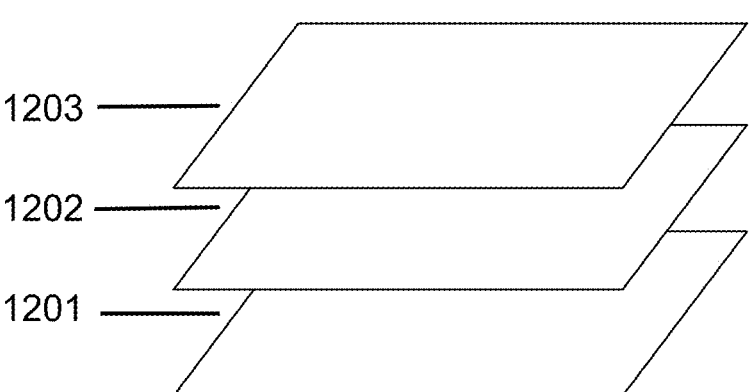
FIG. 12 shows an example of integration of a haptic surface with a visual graphics display, according to an embodiment.

FIG. 12 shows an example of integration of a haptic surface 1203 with a visual graphics display 1201, according to an embodiment. For an embodiment, the haptic surface 1203 is combined with the visual graphics display 1201 and a touch sensor 1202 to make a touchscreen which can provide tactile feedback to a user allowing the user to interact with the touch screen without looking at the screen. FIG. 12 includes the touch sensor 1202 configured to measure position, pressure, and/or an extent of body part in contact with the system 1200. FIG. 12 further shows a haptic surface according to at least some of the described embodiments that outputs (generates) tactile patterns to a user. For an embodiment, the haptic surface generates tactile patterns to represent shapes so that a user can perceive location and shape information without the use of their eyes.

Figure 13:
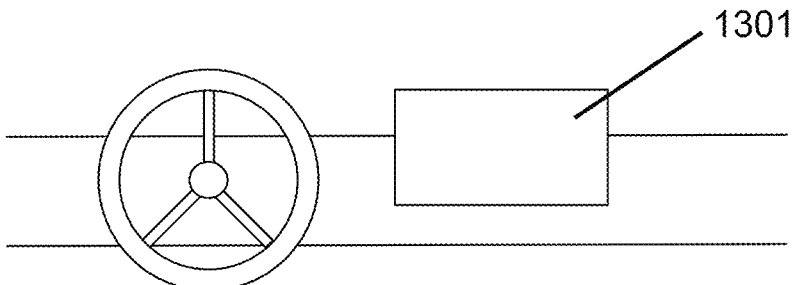
FIG. 13 shows an example automotive touch screen application, according to an embodiment.

FIG. 13 shows an example automotive touch screen application 1300, according to an embodiment. FIG. 13 further shows a location of a system integrated into an infotainment system touchscreen 1301 that includes at least some of the disclosed embodiments of haptic surfaces.

A third category of device harnesses the sense of touch to convey information to the human brain. Prior academic research has shown that it is possible to train the brain through neuroplasticity to interpret tactile sensations as words or pieces of information. Existing actuator technology has limited use of this approach in a small wearable form factor due to the fact that each actuator stimulates a large number of receptors at any given time which combined with the limited temporal and frequency response of conventional actuators results in a very small tactile vocabulary. Using the systems and methods described herein, a small wearable can be made which can address each individual receptor at its full perceptual bandwidth resulting in a large tactile vocabulary to map to various words, phonemes and other information. Such a device could be in the form factor of a watch strap which pairs to a phone or other device and displays text messages as spatio-temporal patterns on the skin allowing a user to 'read' messages without distracting them from their day-to-day activities.

Figure 14:
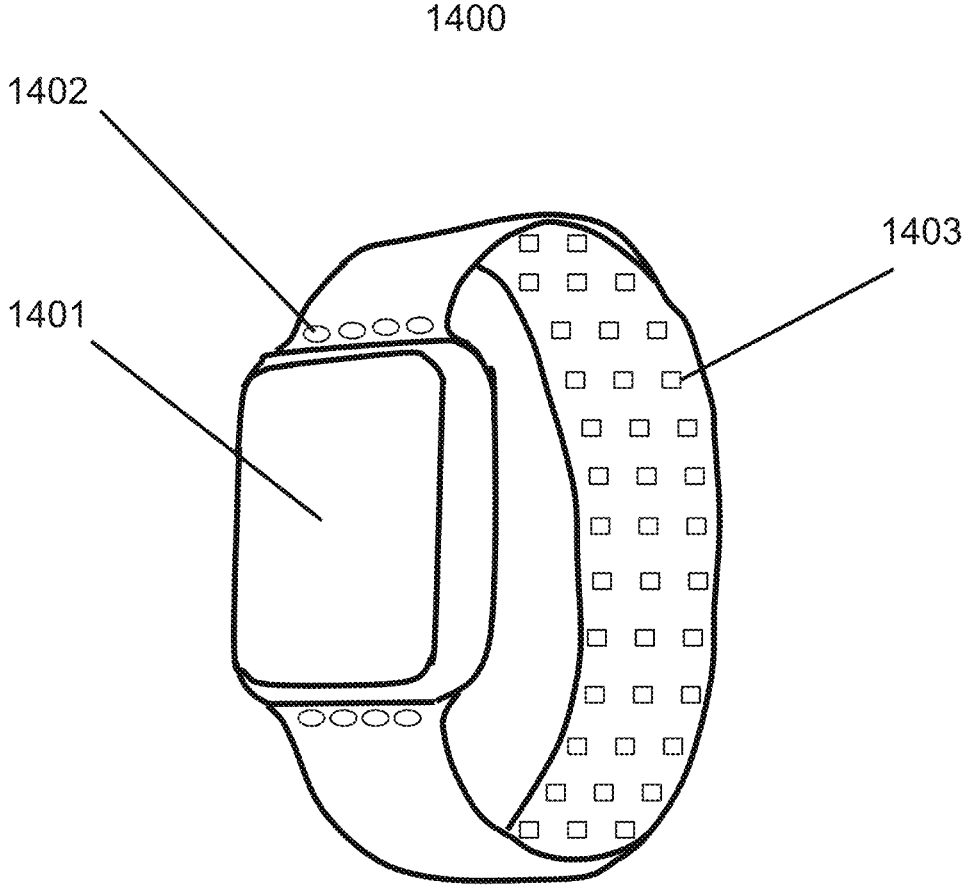
FIG. 14 shows an example device that allows a user to read messages through the skin in a wristband form factor, according to an embodiment.

FIG. 14 shows an example device that allows a user to read messages through the skin in a wristband form factor, according to an embodiment. As shown, a wrist worn device 1400 generates tactile sensations through a wristband. Sensations generated by the wristband can be designed to be paired with words, phonemes or other information to allow the wrist worn device 1400 to pass messages to a user. For an embodiment, the wrist worn device 1400 includes a puck 1401 that includes supporting electronics. Further, for an embodiment, the wrist worn device 1400 includes a plurality of actuators 1402, and a plurality of target pixels 1403. For an embodiment, the haptic surface generates tactile patterns mapped to words, letters or phonemes so that a user can receive information through their skin.

Other possible applications where the described tactile display technology can be integrated include table top surfaces, car interior surfaces, gloves, laptop touchpads, laptop screens, machine controls etc.

FIG. 15 shows steps of a method of haptic surface system, according to an embodiment. A first step 1510 includes generating, by a plurality of actuators, mechanical waves in a haptic surface through control of each of the plurality of actuators. A second step 1520 includes addressing individual pixels of a plurality of pixels of the haptic surface by multiplexing of the mechanical waves which generate mechanical displacement of one or more vector axes at locations of each of the individual pixels. A third step 1530 includes decorrelating, by a plurality of channel decorrelator elements, different transmission paths between the plurality of actuators and the locations of the plurality of pixels on the haptic surface.

Although specific embodiments have been described and illustrated, the embodiments are not to be limited to the specific forms or arrangements of parts so described and illustrated. The embodiments described are to only be limited by the claims.

What is claimed:

1. A system, comprising:
a haptic surface;
a plurality of actuators, each actuator configured to:
   generate mechanical waves in the haptic surface through control of each of the plurality of actuators;
   wherein individual pixels of a plurality of pixels of the haptic surface are individually addressable by multiplexing of the mechanical waves which generate mechanical displacement of one or more vector axes at locations of each of the individual pixels;
the system further comprising a plurality of channel decorrelator elements, wherein the plurality of channel decorrelator elements are located and configured to decorrelate different transmission paths between the plurality of actuators and the locations of the plurality of pixels on the haptic surface;
wherein each of the plurality of pixels are individually addressable through time division multiplexing of the mechanical waves, and wherein the system is further configured to:
   a. calibrate the haptic surface to generate a channel response matrix between each of the plurality of actuators and each of the plurality of pixels;
   b. utilize a sensor to measure a location and extent of a body part in contact with the haptic surface to determine which of the plurality of pixels to target;
   c. generate a lookup table for each of the plurality of actuators for each time slot of the time division multiplexing which identifies which target pixel to address by retrieving instructions, wherein the instructions inform which tactile pattern is to be sent to each target pixel, wherein the tactile pattern is one of a plurality of tactile patterns, wherein each tactile pattern defines a surface geometry or texture, and assigning the corresponding time slots of the lookup table to the appropriate target pixel by extracting from a database the spatio-temporal pattern associated with the selected tactile pattern;
   d. utilize the generated lookup table to identify which channels from the channel response matrix are to be used, and invert a corresponding channel response to generate beamforming transmit waveforms to be transmitted in each time slot from each of the plurality of actuators.

2. The system in claim 1, wherein the beamforming transmit waveforms are generated using time reversal processing, comprising computing the beamforming transmit waveforms through deconvolution, and wherein a multiplexing ratio of the time division multiplexing is determined from a ratio of a haptic surface channel response duration, wherein the haptic surface channel response duration includes a longest duration for a signal to attenuate to a fraction of its maximum received signal for any of potential target pixels from any of the plurality of actuators, and a shortest duration between pulses intended to be perceived at target skin touch sense receptors, greater or equal to the shortest duration between pulses which a targeted type of skin touch receptor can perceive.

3. The system of claim 1, wherein the haptic surface includes a propagation layer configured to support propagation of an ultrasonic mechanical wave, wherein a wavelength of the ultrasonic mechanical wave is less than twice a spacing between targeted types of skin touch receptors, and an attenuation of the propagation layer is selected in conjunction with the plurality of channel decorrelator elements to target a spread of a channel impulse response between each of the plurality of pixels and each of the plurality of actuators.

4. The system of claim 3, wherein a periphery of the propagation layer is surrounded by a second medium selected for a difference in acoustic impedance between a material of the propagation layer and a material of the second medium.

5. The system of claim 1, wherein the haptic surface includes a propagation layer configured to support ultrasonic flexural modes of vibration, wherein a thickness of the propagation layer is selected to be smaller than a shortest wavelength of the mechanical waves propagating in the propagation layer, wherein a wavelength of the mechanical waves is less than twice a spacing between targeted types of skin touch receptors, and wherein a material of the propagation layer is selected based on a ratio of a density of the propagation layer to an elastic modulus, and based on a resistance of the propagation layer to plastic deformation, and based on a propagation attenuation of the propagation layer at frequencies of the mechanical waves.

6. The system of claim 1, wherein the plurality of channel decorrelator elements comprise scattering elements configured to introduce scattering of the mechanical waves in the haptic surface, where the scattering elements include structures comprising materials selected for a difference in acoustic properties computed from the material properties of the channel decorrelator elements and the propagation layer.

7. The system of claim 1, wherein the plurality of channel decorrelator elements comprise dispersive elements configured to introduce time spreading of individual frequency components of the mechanical waves in the haptic surface, wherein the dispersive elements include materials or structures with frequency dependent wave speeds for a mode of propagation used in the propagation layer of the haptic surface, and wherein the mode of propagation is the type of mechanical wave.

8. The system of claim 1, wherein a location and a shape of one or more of the plurality channel decorrelator elements or a periphery is selected to reduce cross correlation between neighboring pixels, enhance energy received at the plurality of pixels and control a spread of a channel impulse response at each pixel of the plurality of pixels.

9. The system of claim 1, comprising a touch layer adjacent to a propagation layer of the haptic surface designed to be contacted by human skin, and configured to slow impulses received from the propagation layer, wherein a duration of an impulse received at the human skin is greater than a minimum impulse duration which can be perceived by the touch receptors of the human skin while inhibiting lateral spreading of energy in two other axes and isolating pressure of the human skin contact from the propagation layer.

10. The system of claim 1, further comprising a touch layer adjacent to a propagation layer of the haptic surface configured for contact by human skin, and configured to enhance momentum transfer of an acoustic radiation force while isolating pressure of a finger contact from the propagation layer.

11. The system of claim 1, comprising a bottom layer adjacent to a propagation layer of the haptic surface configured to confine propagating waves to within the propagation layer, wherein the bottom layer comprises an elastic foundation or a phononic bandgap designed to block the specific frequencies of mechanical waves propagating in the propagation layer through a periodic modulation of material or structural properties.

12. The system of claim 1, where a single transmitter chain is connected to an array of narrowband high Q transducers in parallel operating as an actuator of the plurality of actuators, wherein a frequency bandwidth and frequency separation between adjacent transducers is selected to allow for orthogonal operation, and wherein individual elements may be located spatially separate from one another to enhance frequency dependent channel decorrelation.

13. The system of claim 1, further comprising deformation, force or pressure sensors for determining whether a user is locating a button or pressing a button by comparing the pressure of contact for each of one or more body parts in contact with the haptic surface with calibration data, to aid in selection of appropriate tactile patterns to be transmitted at each target pixel within each contact area.

14. The system of claim 1, wherein the system is further configured to determine a channel response matrix, wherein the channel response matrix includes an impulse response over an operating frequency range of the propagation layer, between each of the plurality of actuators and each of the plurality of pixels.

15. A method comprising:
generating, by a plurality of actuators, mechanical waves in a haptic surface through control of each of the plurality of actuators;
individually addressing individual pixels of a plurality of pixels of the haptic surface by multiplexing of the mechanical waves which generate mechanical displacement of one or more vector axes at locations of each of the individual pixels; and
decorrelating, by a plurality of channel decorrelator elements, different transmission paths between the plurality of actuators and the locations of the plurality of pixels on the haptic surface;
wherein each of the plurality of pixels are individually addressable through time division multiplexing of the mechanical waves, and wherein the method further comprises:
a. calibrating the haptic surface to generate a channel response matrix between each of the plurality of actuators and each of the plurality of pixels;

b. utilizing a sensor to measure a location and extent of a body part in contact with the haptic surface to determine which of the plurality of pixels to target;

c. generating a lookup table for each of the plurality of actuators for each time slot of the time division multiplexing which identifies which target pixel to address by retrieving instructions, wherein the instructions inform which tactile pattern is to be sent to each target pixel, wherein the tactile pattern is one of a plurality of tactile patterns, wherein each tactile pattern defines a surface geometry or texture, and assigning the corresponding time slots of the lookup table to the appropriate target pixel by extracting from a database the spatio-temporal pattern associated with the selected tactile pattern; and d. utilizing the generated lookup table to identify which channels from the channel response matrix are to be used, and invert a corresponding channel response to generate beamforming transmit waveforms to be transmitted in each time slot from each of the plurality of actuators.

* * * * *